United States Patent
Park

(10) Patent No.: US 10,963,654 B2
(45) Date of Patent: Mar. 30, 2021

(54) ELECTRONIC DEVICE FOR TRANSMITTING DATA AND METHOD FOR CONTROLLING THE SAME

(71) Applicant: Samsung Electronics Co., Ltd., Gyeonggi-do (KR)

(72) Inventor: Jeong-Hoon Park, Gyeonggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 123 days.

(21) Appl. No.: 15/725,396

(22) Filed: Oct. 5, 2017

(65) Prior Publication Data
US 2018/0107849 A1    Apr. 19, 2018

(30) Foreign Application Priority Data
Oct. 13, 2016   (KR) .................. 10-2016-0132950

(51) Int. Cl.
| | | |
|---|---|---|
| *G06K 7/08* | (2006.01) | |
| *G06Q 20/34* | (2012.01) | |
| *G06T 7/70* | (2017.01) | |
| *H04W 4/80* | (2018.01) | |
| *G06T 7/60* | (2017.01) | |

(52) U.S. Cl.
CPC ............ *G06K 7/087* (2013.01); *G06Q 20/34* (2013.01); *G06T 7/60* (2013.01); *G06T 7/70* (2017.01); *H04W 4/80* (2018.02)

(58) Field of Classification Search
CPC .......... G06K 7/087; G06T 7/70; H04W 4/80; G06Q 20/34
See application file for complete search history.

(56) References Cited

U.S. PATENT DOCUMENTS

| | | | | |
|---|---|---|---|---|
| 3,997,835 | A * | 12/1976 | Ando ................ | G01B 7/023 324/207.26 |
| 5,721,487 | A * | 2/1998 | Milosevic ............ | G01B 7/023 324/207.12 |
| 6,667,612 | B2 * | 12/2003 | Duret ................ | G01B 7/003 324/207.17 |
| 8,602,312 | B2 | 12/2013 | Cloutier et al. | |
| 8,727,219 | B1 | 5/2014 | Mullen | |
| 8,814,046 | B1 | 8/2014 | Wallner | |
| 9,576,159 | B1 * | 2/2017 | Templeton .......... | G06Q 20/353 |
| 10,182,328 | B1 * | 1/2019 | Maibach ............. | G07G 3/00 |

(Continued)

FOREIGN PATENT DOCUMENTS

EP      3 062 273 A2    8/2016

OTHER PUBLICATIONS

Jacalyn Winkler, "Standards and Architecture for Token-Ring Local Area Networks" 1986, pp. 479-488, IBM Corporation.

(Continued)

*Primary Examiner* — Thien M Le
*Assistant Examiner* — Asifa Habib
(74) *Attorney, Agent, or Firm* — Cha & Reiter. LLC.

(57) ABSTRACT

According to an embodiment of the present disclosure, an electronic device for transmitting data comprises a memory storing the data, a processor, and a coil. The processor may perform controls to detect a data receiving device configured to detect a magnetic field corresponding to the data and apply a voltage or a current corresponding to the data to the coil in response to the detection of the data receiving device.

23 Claims, 23 Drawing Sheets

(56) References Cited

U.S. PATENT DOCUMENTS

| | | | |
|---|---|---|---|
| 2004/0095291 A1* | 5/2004 | Shigemasa | G06K 19/0701 |
| | | | 343/913 |
| 2009/0159707 A1* | 6/2009 | Mullen | G06K 19/0723 |
| | | | 235/493 |
| 2012/0037709 A1* | 2/2012 | Cloutier | G06K 19/06206 |
| | | | 235/488 |
| 2015/0079903 A1* | 3/2015 | Song | H04W 4/80 |
| | | | 455/41.1 |
| 2017/0185811 A1* | 6/2017 | Hoson | G06K 7/08 |
| 2017/0364784 A1* | 12/2017 | Nielsen | G07F 7/025 |
| 2018/0322501 A1* | 11/2018 | Eisen | G06F 21/34 |

OTHER PUBLICATIONS

European Search Report dated Dec. 20, 2017.
Roselli; "Green RFID Systems"; Cambridge University Press; Sep. 25, 2014; XP055698850.
European Search Report dated Jun. 19, 2020.

* cited by examiner

ELECTRONIC DEVICE FOR TRANSMITTING DATA AND METHOD FOR CONTROLLING THE SAME

CLAIM OF PRIORITY

This application claims the benefit under 35 U.S.C. § 119(a) of a Korean patent application filed in the Korean Intellectual Property Office on Oct. 13, 2016 and assigned Serial No. 10-2016-0132950, the entire disclosure of which is incorporated herein by reference.

TECHNICAL FIELD

The present disclosure generally relates to electronic devices for transmitting data and methods for controlling the same.

DISCUSSION OF RELATED ART

As it may be known in the art, magnetic stripe payment cards used in payment systems may include magnetic material. Meanwhile, point-of-sale (PoS) terminals used in payment systems that authorize payments when used in conjunction with magnetic stripe payment cards may include reading headers for detecting variation in magnetic field generated due to a moving of the magnetic stripe payment cards. A user may insert a magnetic stripe payment card into the reading header of a PoS terminal and may move the magnetic stripe payment card, for example, by swiping the card. As the payment card moves, the variation in magnetic field may arise, and this may be detected by the PoS terminal. The PoS terminal may obtain payment data by the variation in magnetic field.

Meanwhile, electronic devices using magnetic secured transfer or magnetic stripe transmission (MST) communication may generate varied magnetic fields that correspond to the above-described variation in magnetic field generated by the movement of the magnetic stripe payment card. The varied magnetic field may also be detected by the PoS terminal. Accordingly, electronic devices capable of transmitting payment data have been provided for existing PoS terminals.

The above information is presented as background information only to assist with an understanding of the present disclosure. No determination has been made, and no assertion is made, as to whether any of the above might be applicable as prior art with regard to the present disclosure.

SUMMARY

Conventional electronic devices using MST communication apply square waveforms of power to their coils to generate magnetic field. In order to a PoS terminal to detect the magnetic field, a relatively high intensity of magnetic field needs to be generated. Further, for stable transmission of payment data, conventional electronic devices using MST communication repeatedly generate magnetic fields corresponding to the payment data. Accordingly, power consumption may sharply be increased when using MST communication. Such problem may worsen when the electronic device is made compact for portability and therefore its battery may be relatively small.

The present disclosure has been conceived to address the foregoing or other problems. According to one embodiment of the present disclosure, an electronic device and method for controlling the same may detect a data receiving device, which may detect magnetic fields, and generate a magnetic field corresponding to the data to be transmitted in response to the detection of the data receiving device.

According to an embodiment of the present disclosure, an electronic device for transmitting data may comprise a memory storing the data, a processor, and a coil, wherein the processor may perform controls to detect a data receiving device configured to detect a magnetic field corresponding to the data and apply a voltage or a current corresponding to the data to the coil in response to the detection of the data receiving device.

According to an embodiment of the present disclosure, a method for controlling an electronic device for transmitting data may comprise detecting a data receiving device configured to detect a magnetic field corresponding to the data and generating the magnetic field corresponding to the data in response to the detection of the data receiving device.

According to an embodiment of the present disclosure, an electronic device for transmitting data may comprise a memory storing the data, a processor, and a coil, wherein the processor may perform controls to determine a distance between the electronic device and a data receiving device upon receiving a data transmission request, determine a data transmission condition based on the distance between the electronic device and the data receiving device, and apply a current or a voltage corresponding to the data to the coil based on the determined data transmission condition.

According to an embodiment of the present disclosure, a method for controlling an electronic device for transmitting data may comprise obtaining a distance between the electronic device and a data receiving device upon receiving a data transmission request, determining a data transmission condition based on the distance between the electronic device and the data receiving device, and generating a magnetic field corresponding to the data based on the determined data transmission condition. Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

A more complete appreciation of the present disclosure and many of the attendant aspects thereof will be more readily understood by reference to the following detailed description when considered in connection with the accompanying drawings, wherein.

Throughout the drawings, like reference numerals will be understood to refer to like parts, components, and structures.

DETAILED DESCRIPTION

Figure 1:
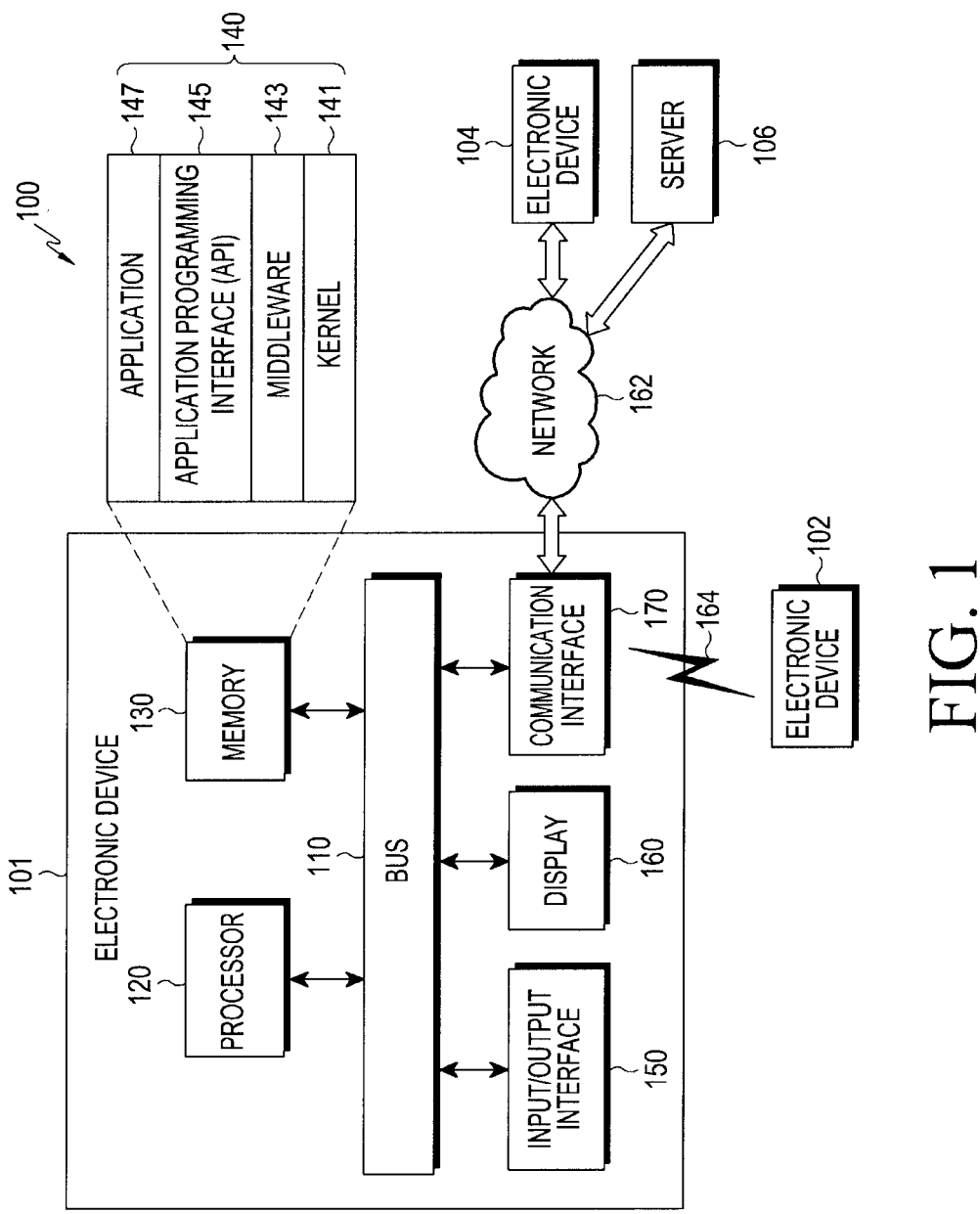
FIG. 1 is a block diagram illustrating an electronic device and a network according to an embodiment of the present disclosure.

Hereinafter, embodiments of the present disclosure are described with reference to the accompanying drawings. However, it should be appreciated that the present disclosure is not limited to the embodiments and the terminology used herein, and all changes and/or equivalents or replacements thereto also belong to the scope of the present disclosure. The same or similar reference denotations may be used to refer to the same or similar elements throughout the specification and the drawings. It is to be understood that the singular forms "a," "an," and "the" include plural references unless the context clearly dictates otherwise. As used herein, the terms "A or B" or "at least one of A and/or B" may include all possible combinations of A and B. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the terms "configured to" may be interchangeably used with other terms, such as "suitable for," "capable of" "modified to," "made to," "adapted to," "able to," or "designed to" in hardware or software in the context. Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device. In some embodiments, examples of the smart home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an embodiment of the present disclosure, the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, drones, automatic teller's machines (ATMs), point of sales (POS) devices, or internet of things (IoT) devices (e.g., a bulb, various sensors, a sprinkler, a fire alarm, a thermostat, a street light, a toaster, fitness equipment, a hot water tank, a heater, or a boiler). According to various embodiments of the disclosure, examples of the electronic device may at least one of part of a piece of furniture, building/structure or vehicle, an electronic board, an electronic signature receiving device, a projector, or various measurement devices (e.g., devices for measuring water, electricity, gas, or electromagnetic waves). According to embodiments of the present disclosure, the electronic device may be flexible or may be a combination of the above-enumerated electronic devices. According to an embodiment of the disclosure, the electronic devices are not limited to those described above. As used herein, the term "user" may denote a human or another device (e.g., an artificial intelligent electronic device) using the electronic device.

Referring to FIG. 1, according to an embodiment of the present disclosure, an electronic device 101 is included in a network environment 100. The electronic device 101 may include a bus 110, a processor 120, a memory 130, an input/output interface 150, a display 160, and a communication interface 170. In some embodiments, the electronic device 101 may exclude at least one of the components or may add another component. The bus 110 may include a circuit for connecting the components 110 to 170 with one another and transferring communications (e.g., control messages or data) between the components. The processing module 120 may include one or more of a central processing unit (CPU), an application processor (AP), or a communication processor (CP). The processor 120 may perform control on at least one of the other components of the electronic device 101, and/or perform an operation or data processing relating to communication.

The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The memory 130 may include a volatile and/or non-volatile memory. For example, the memory 130 may store commands or data related to at least one other component of the electronic device 101. According to an embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS). For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example. Further, the middleware 143 may process one or more task requests received from the application program 147 in order of priority. For example, the middleware 143 may assign a priority of using system resources (e.g., bus 110, processor 120, or memory 130) of the electronic device 101 to at least one of the application programs 147 and process one or more task requests. The API 145 is an interface allowing the application 147 to control functions provided from the kernel 141 or the middleware 143. For example, the API 133 may include at least one interface or function (e.g., a command) for filing control, window control, image processing or text control. For example, the input/output interface 150 may transfer commands or data input from the user or other external device to other component(s) of the electronic device 101 or may output commands or data received from other component(s) of the electronic device 101 to the user or other external devices.

The display 160 may include, e.g., a liquid crystal display (LCD), a light emitting diode (LED) display, an organic light emitting diode (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user. For example, the communication interface 170 may set up communication between the electronic device 101 and an external device (e.g., a first external electronic device 102, a second external electronic device 104, or a server 106). For example, the communication interface 170 may be connected with a network 162 through wireless communication or wired communication and may communicate with an external device (e.g., the second external electronic device 104 or server 106).

The wireless communication may include cellular communication which uses at least one of, e.g., long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM). According to an embodiment of the present disclosure, the wireless communication may include at least one of, e.g., wireless fidelity (Wi-Fi), Bluetooth, Bluetooth low power (BLE), ZigBee, near field communication (NFC), magnetic secure transmission (MST), radio frequency, or body area network (BAN). According to an embodiment of the present disclosure, the wireless communication may include global navigation satellite system (GNSS). The GNSS may be, e.g., global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, power line communication (PLC), or plain old telephone service (POTS). The network 162 may include at least one of telecommunication networks, e.g., a computer network (e.g., local area network (LAN) or wide area network (WAN)), Internet, or a telephone network.

The first and second external electronic devices 102 and 104 each may be a device of the same or a different type from the electronic device 101. According to an embodiment of the present disclosure, all or some of operations executed on the electronic device 101 may be executed on another or multiple other electronic devices (e.g., the external electronic devices 102 and 104 or server 106). According to an embodiment of the present disclosure, when the electronic device 101 should perform some function or service automatically or at a request, the electronic device 101, instead of executing the function or service on its own or additionally, may request another device (e.g., external electronic devices 102 and 104 or server 106) to perform at least some functions associated therewith. The other electronic device (e.g., external electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

According to an embodiment of the present disclosure, the processor 120 may perform control to detect a data receiving device that detects a magnetic field corresponding to data to be transmitted and to apply a voltage or current corresponding to the data to a coil of the electronic device 101, in response to the detection of the data receiving device.

According to an embodiment of the present disclosure, the processor 120 may perform control to apply test power to the coil.

According to an embodiment of the present disclosure, the processor 120 may obtain at least one of a value of a current, a value of a voltage, a value of power, and a value of impedance at at least one position of the electronic device and determine whether the data receiving device is detected based on at least one of the value of the current, the value of the voltage, the value of the power, and the value of the impedance.

According to an embodiment of the present disclosure, the processor 120 may determine that the data receiving device is detected when a difference between an initial value and at least one of the value of the current, the value of the voltage, the value of the power, and the value of the impedance at the, at least, one point of the electronic device exceeds a preset threshold.

According to an embodiment of the present disclosure, the processor 120 may determine a distance between the electronic device and the data receiving device based on at least one of the value of the current, the value of the voltage, the value of the power, and the value of the impedance and determine at least one of a transmission count for a transmission of the data, a magnitude of the voltage or current corresponding to the data, and a data rate for the transmission of the data based on the distance between the electronic device and the data receiving device.

According to an embodiment of the present disclosure, the electronic device 101 may further comprise a magnetic sensor configured to sense a strength of a magnetic field. When a difference between an initial value and at least one of the value of the current, the value of the voltage, the value of the power, and the value of the impedance at the, at least, one point of the electronic device exceeds a preset threshold, the processor 120 may determine that the data receiving device is detected.

According to an embodiment of the present disclosure, the processor 120 may determine the distance between the electronic device and the data receiving device based on the value of the strength of the magnetic field sensed by the magnetic sensor and determine at least one of a transmission count for a transmission of the data, a magnitude of the voltage or current corresponding to the data, and a data rate for the transmission of the data based on the distance between the electronic device and the data receiving device.

According to an embodiment of the present disclosure, the electronic device 101 may further comprise a camera. The processor 120 may analyze an image obtained by the camera and determine whether the data receiving device is detected based on a result of the analysis of the image.

According to an embodiment of the present disclosure, the processor 120 may determine the distance between the electronic device and the data receiving device based on a result of the analysis of the image and determine at least one of a transmission count for a transmission of the data, a magnitude of the voltage or current corresponding to the data, and a data rate for the transmission of the data based on the distance between the electronic device and the data receiving device.

According to an embodiment of the present disclosure, the processor 120 may identify a reading header of the data receiving device in the image and a size of the reading header and determine the distance between the electronic device and the data receiving device based on the size of the identified reading header.

According to an embodiment of the present disclosure, the processor 120 may perform control to determine a distance between the electronic device and a data receiving device upon receiving a data transmission request, determine a data transmission condition based on the distance between the electronic device and the data receiving device, and apply a current or a voltage corresponding to the data to the coil based on the determined data transmission condition.

According to an embodiment of the present disclosure, the processor 120 may perform control to apply test power to the coil, obtain at least one of a value of a current, a value of a voltage, a value of power, and a value of impedance at at least one position of the electronic device, and determine the distance between the electronic device and the data receiving device based on at least one of the value of the current, the value of the voltage, the value of the power, and the value of the impedance.

According to an embodiment of the present disclosure, the processor 120 may perform control to apply test power to the coil and determine the distance between the electronic device and the data receiving device based on a value of the strength of the magnetic field sensed by a magnetic sensor of the electronic device 101.

According to an embodiment of the present disclosure, the processor 120 may analyze an image obtained by a camera and determine the distance between the electronic device and the data receiving device based on a result of the analysis of the image.

According to an embodiment of the present disclosure, the data transmission condition may include at least one of a transmission count for a transmission of the data, a magnitude of the voltage or current corresponding to the data, and a data rate for the transmission of the data.

Figure 2:
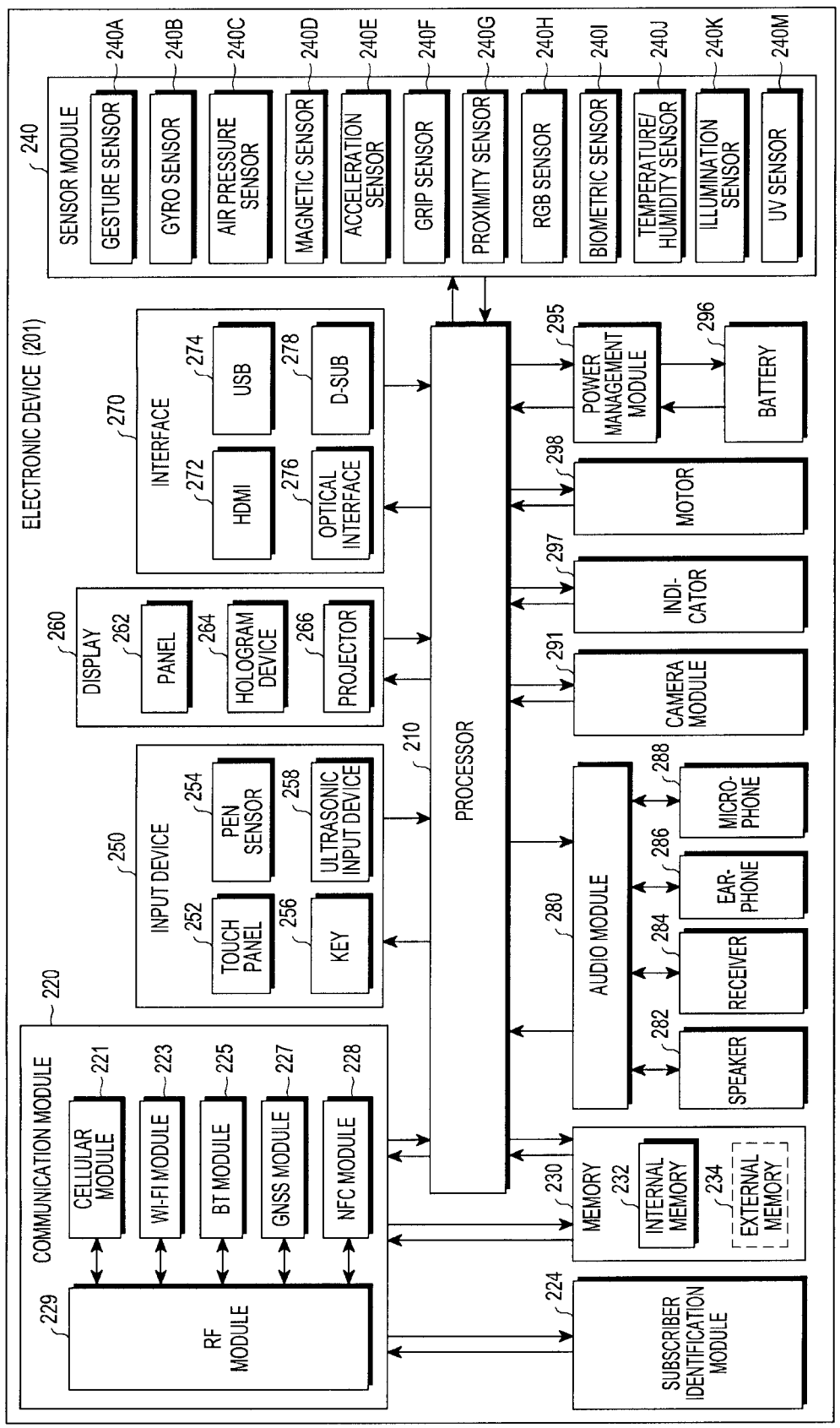
FIG. 2 is a block diagram illustrating an electronic device according to an embodiment of the present disclosure.

FIG. 2 is a block diagram illustrating an electronic device 201 according to an embodiment of the present disclosure. The electronic device 201 may include the whole or part of the configuration of, e.g., the electronic device 101 shown in FIG. 1. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 may control multiple hardware and software components connected to the processor 210 by running, e.g., an operating system or application programs, and the processor 210 may process and compute various data. The processor 210 may be implemented in, e.g., a system on chip (SoC). According to an embodiment of the present disclosure, the processor 210 may further include a graphic processing unit (GPU) and/or an image signal processor. The processor 210 may include at least some (e.g., the cellular module 221) of the components shown in FIG. 2. The processor 210 may load a command or data received from at least one of other components (e.g., a non-volatile memory) on a volatile memory, process the command or data, and store resultant data in the non-volatile memory.

The communication module 220 may have the same or similar configuration to the communication interface 170. The communication module 220 may include, e.g., a cellular module 221, a wireless fidelity (Wi-Fi) module 223, a Bluetooth (BT) module 225, a GNSS module 227, a NFC module 228, and a RF module 229. The cellular module 221 may provide voice call, video call, text, or Internet services through, e.g., a communication network. The cellular module 221 may perform identification or authentication on the electronic device 201 in the communication network using a subscriber identification module 224 (e.g., the SIM card). According to an embodiment of the present disclosure, the cellular module 221 may perform at least some of the functions provided by the processor 210. According to an embodiment of the present disclosure, the cellular module 221 may include a communication processor (CP). According to an embodiment of the present disclosure, at least some (e.g., two or more) of the cellular module 221, the Wi-Fi module 223, the Bluetooth module 225, the GNSS module 227, or the NFC module 228 may be included in a single integrated circuit (IC) or an IC package. The RF module 229 may communicate data, e.g., communication signals (e.g., RF signals). The RF module 229 may include, e.g., a transceiver, a power amp module (PAM), a frequency filter, a low noise amplifier (LNA), or an antenna. According to an embodiment of the present disclosure, at least one of the cellular module 221, the Wi-Fi module 223, the Bluetooth module 225, the GNSS module 227, or the NFC module 228 may communicate RF signals through a separate RF module. The subscription identification module 224 may include, e.g., a card including a subscriber identification module, or an embedded SIM, and may contain unique identification information (e.g., an integrated circuit card identifier (ICCID) or subscriber information (e.g., an international mobile subscriber identity (IMSI)).

The memory 230 (e.g., the memory 130) may include, e.g., an internal memory 232 or an external memory 234. The internal memory 232 may include at least one of, e.g., a volatile memory (e.g., a dynamic RAM (DRAM), a static RAM (SRAM), a synchronous dynamic RAM (SDRAM), etc.) or a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD). The external memory 234 may include a flash drive, e.g., a compact flash (CF) memory, a secure digital (SD) memory, a micro-SD memory, a min-SD memory, an extreme digital (xD) memory, a multimedia card (MMC), or a memory Stick™. The external memory 234 may be functionally or physically connected with the electronic device 201 via various interfaces.

For example, the sensor module 240 may measure a physical quantity or detect an operational state of the electronic device 201, and the sensor module 240 may convert the measured or detected information into an electrical signal. The sensor module 240 may include at least one of, e.g., a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red-green-blue (RGB) sensor, a bio sensor 240I, a temperature/humidity sensor 240J, an illumination sensor 240K, or an Ultra Violet (UV) sensor 240M. Additionally or alternatively, the sensing module 240 may include, e.g., an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensing module. According to an embodiment of the present disclosure, the electronic device 201 may further include a processor configured to control the sensor module 240 as part of the processor 210 or separately from the processor 210, and the electronic device 2701 may control the sensor module 240 while the processor 210 is in a sleep mode.

The input unit 250 may include, e.g., a touch panel 252, a (digital) pen sensor 254, a key 256, or an ultrasonic input device 258. The touch panel 252 may use at least one of capacitive, resistive, infrared, or ultrasonic methods. The touch panel 252 may further include a control circuit. The touch panel 252 may further include a tactile layer and may provide a user with a tactile reaction. The (digital) pen sensor 254 may include, e.g., a part of a touch panel or a separate sheet for recognition. The key 256 may include e.g., a physical button, optical key or key pad. The ultrasonic input device 258 may sense an ultrasonic wave generated from an input tool through a microphone (e.g., the microphone 288) to identify data corresponding to the sensed ultrasonic wave.

The display 260 (e.g., the display 160) may include a panel 262, a hologram device 264, a projector 266, and/or a control circuit for controlling the same. The panel 262 may be implemented to be flexible, transparent, or wearable. The panel 262, together with the touch panel 252, may be configured in one or more modules. According to an embodiment of the present disclosure, the panel 262 may include a pressure sensor (or pose sensor) that may measure the strength of a pressure by the user's touch. The pressure sensor may be implemented in a single body with the touch panel 252 or may be implemented in one or more sensors separate from the touch panel 252. The hologram device 264 may make three dimensional (3D) images (holograms) in the air by using light interference. The projector 266 may display an image by projecting light onto a screen. The screen may be, for example, located inside or outside of the electronic device 201. The interface 270 may include e.g., a high definition multimedia interface (HDMI) 272, a USB 274, an optical interface 276, or a D-subminiature (D-sub) 278. The interface 270 may be included in e.g., the communication interface 170 shown in FIG. 1. Additionally or alternatively, the interface 270 may include a mobile high-definition link (MHL) interface, a secure digital (SD) card/multimedia card (MMC) interface, or infrared data association (IrDA) standard interface.

The audio module 280 may converting, e.g., a sound signal into an electrical signal and vice versa. At least a part of the audio module 280 may be included in e.g., the input/output interface 145 as shown in FIG. 1. The audio module 280 may process sound information input or output through e.g., a speaker 282, a receiver 284, an earphone 286, or a microphone 288. For example, the camera module 291 may be a device for capturing still images and videos, and may include, according to an embodiment of the present disclosure, one or more image sensors (e.g., front and back sensors), a lens, an image signal processor (ISP), or a flash such as an LED or xenon lamp. The power manager module 295 may manage power of the electronic device 201, for example. According to an embodiment of the present disclosure, the power manager module 295 may include a power management Integrated circuit (PMIC), a charger IC, or a battery or fuel gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 may include, e.g., a rechargeable battery or a solar battery.

The indicator 297 may indicate a particular state of the electronic device 201 or a part (e.g., the processor 210) of the electronic device, including e.g., a booting state, a message state, or recharging state. The motor 298 may convert an electric signal to a mechanical vibration and may generate a vibrational or haptic effect. The electronic device 201 may include a mobile TV supporting device (e.g., a GPU) that may process media data as per, e.g., digital multimedia broadcasting (DMB), digital video broadcasting (DVB), or mediaFlo™ standards. Each of the aforementioned components of the electronic device may include one or more parts, and a name of the part may vary with a type of the electronic device. According to various embodiments, the electronic device (e.g., the electronic device 201) may exclude some elements or include more elements, or some of the elements may be combined into a single entity that may perform the same function as by the elements before combined.

Figure 3:
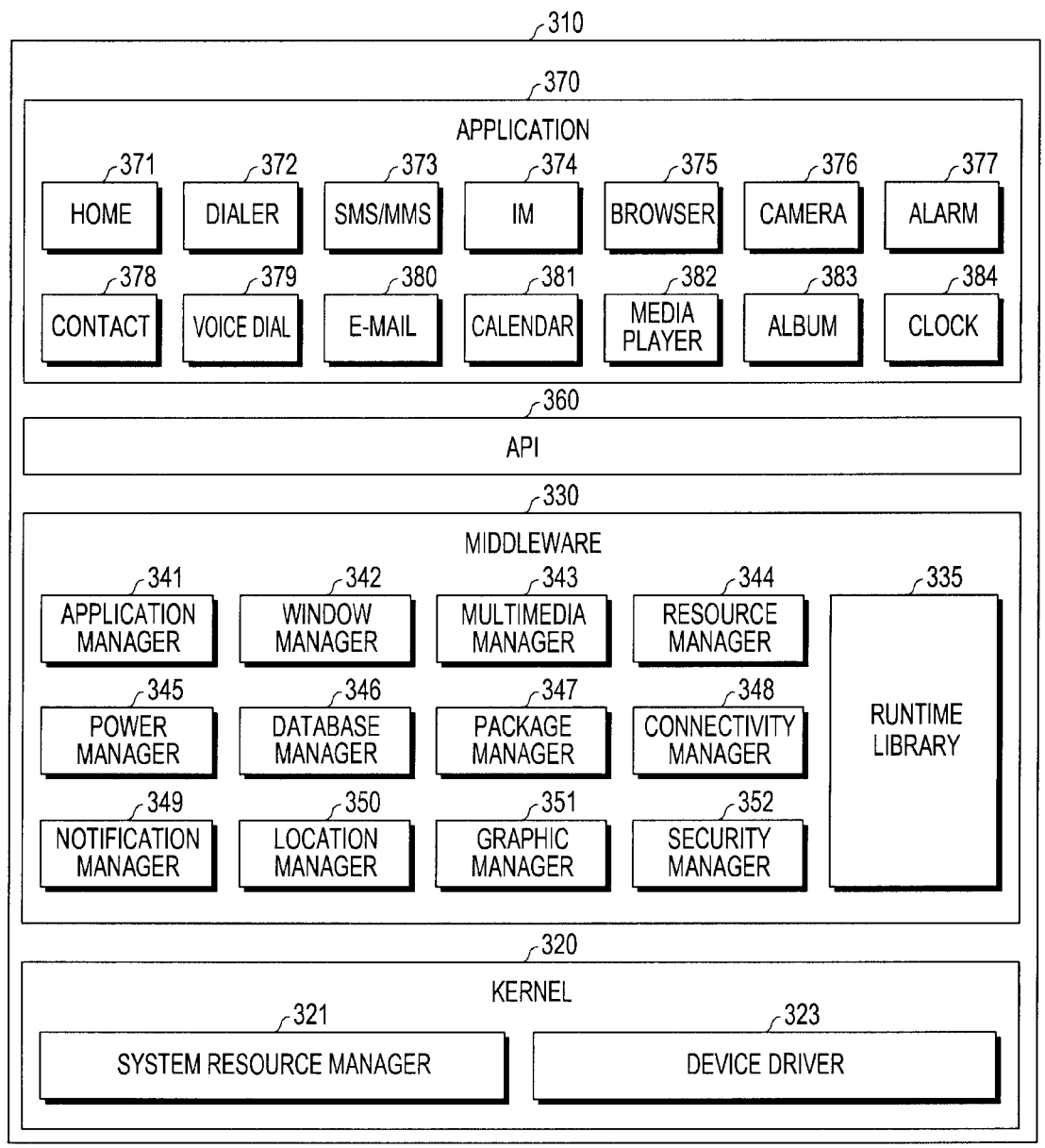
FIG. 3 is a block diagram illustrating a program module according to an embodiment of the present disclosure.

FIG. 3 is a block diagram illustrating a program module according to an embodiment of the present disclosure. According to an embodiment of the present disclosure, the program module 310 (e.g., the program 140) may include an operating system (OS) controlling resources related to the electronic device (e.g., the electronic device 101) and/or various applications (e.g., the application 147) driven on the operating system. The operating system may include, e.g., Android™, iOS™, Windows™, Symbian™, Tizen™, or Bada™. Referring to FIG. 3, the program module 310 may include a kernel 320 (e.g., the kernel 141), middleware 330 (e.g., the middleware 143), an API 360 (e.g., the API 145), and/or an application 370 (e.g., the application program 147). At least a part of the program module 310 may be preloaded on the electronic device or may be downloaded from an external electronic device (e.g., the external electronic devices 102 and 104 or server 106).

The kernel 320 may include, e.g., a system resource manager 321 or a device driver 323. The system resource manager 321 may perform control, allocation, or recovery of system resources. According to an embodiment of the present disclosure, the system resource manager 321 may include a process managing unit, a memory managing unit, or a file system managing unit. The device driver 323 may include, e.g., a display driver, a camera driver, a Bluetooth driver, a shared memory driver, a USB driver, a keypad driver, a Wi-Fi driver, an audio driver, or an inter-process communication (IPC) driver. The middleware 330 may provide various functions to the application 370 through the API 360 so that the application 370 may use limited system resources in the electronic device or provide functions jointly required by applications 370. According to an embodiment of the present disclosure, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module used by a compiler in order to add a new function through a programming language while, e.g., the application 370 is being executed. The runtime library 335 may perform input/output management, memory management, or arithmetic function processing. The application manager 341 may manage the life cycle of, e.g., the applications 370. The window manager 342 may manage GUI resources used on the screen. The multimedia manager 343 may grasp formats necessary to play media files and use a codec appropriate for a format to perform encoding or decoding on media files. The resource manager 344 may manage the source code or memory space of the application 370. The power manager 345 may manage, e.g., the battery capability or power and provide power information necessary for the operation of the electronic device. According to an embodiment of the present disclosure, the power manager 345 may interwork with a basic input/output system (BIOS). The database manager 346 may generate, search, or vary a database to be used in the applications 370. The package manager 347 may manage installation or update of an application that is distributed in the form of a package file.

The connectivity manager 348 may manage, e.g., wireless connectivity. The notification manager 349 may provide an event, e.g., arrival message, appointment, or proximity alert, to the user. The location manager 350 may manage, e.g., locational information on the electronic device. The graphic manager 351 may manage, e.g., graphic effects to be offered to the user and their related user interface. The security manager 352 may provide system security or user authentication, for example. According to an embodiment of the present disclosure, the middleware 330 may include a telephony manager for managing the voice or video call function of the electronic device or a middleware module able to form a combination of the functions of the above-described elements. According to an embodiment of the present disclosure, the middleware 330 may provide a module specified according to the type of the operating system. The middleware 330 may dynamically omit some existing components or add new components. The API 360 may be a set of, e.g., API programming functions and may have different configurations depending on operating systems. For example, in the case of Android or iOS, one API set may be provided per platform, and in the case of Tizen, two or more API sets may be offered per platform.

The application 370 may include an application that may provide, e.g., a home 371, a dialer 372, an SMS/MMS 373, an instant message (IM) 374, a browser 375, a camera 376, an alarm 377, a contact 378, a voice dial 379, an email 380, a calendar 381, a media player 382, an album 383, or a clock 384, a health-care (e.g., measuring the degree of workout or blood sugar), or provision of environmental information (e.g., provision of air pressure, moisture, or temperature information). According to an embodiment of the present disclosure, the application 370 may include an information exchanging application supporting information exchange between the electronic device and an external electronic device. Examples of the information exchange application may include, but is not limited to, a notification relay application for transferring specific information to the external electronic device, or a device management application for managing the external electronic device. For example, the notification relay application may transfer notification information generated by other application of the electronic device to the external electronic device or receive notification information from the external electronic device and provide the received notification information to the user. For example, the device management application may install, delete, or update a function (e.g., turn-on/turn-off the external electronic device (or some elements) or adjusting the brightness (or resolution) of the display) of the external electronic device communicating with the electronic device or an application operating on the external electronic device. According to an embodiment of the present disclosure, the application 370 may include an application (e.g., a healthcare application of a mobile medical device) designated according to an attribute of the external electronic device. According to an embodiment of the present disclosure, the application 370 may include an application received from the external electronic device. At least a portion of the program module 310 may be implemented (e.g., executed) in software, firmware, hardware (e.g., the processor 210), or a combination of at least two or more thereof and may include a module, program, routine, command set, or process for performing one or more functions.

As used herein, the term "module" includes a unit configured in hardware, software, or firmware and may interchangeably be used with other terms, e.g., "logic," "logic block," "part," or "circuit." The module may be implemented mechanically or electronically and may include, e.g., an application-specific integrated circuit (ASIC) chip, field-programmable gate arrays (FPGAs), or programmable logic device, that has been known or to be developed in the future as performing some operations. According to an embodiment of the present disclosure, at least a part of the device (e.g., modules or their functions) or method (e.g., operations) may be implemented as instructions stored in a computer-readable storage medium (e.g., the memory 130), e.g., in the form of a program module. The instructions, when executed by a processor (e.g., the processor 120), may enable the processor to carry out a corresponding function. The computer-readable medium may include, e.g., a hard disk, a floppy disc, a magnetic medium (e.g., magnetic tape), an optical recording medium (e.g., CD-ROM, DVD, magnetic-optical medium (e.g., floptical disk), or an embedded memory. The instruction may include a code created by a compiler or a code executable by an interpreter. Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, in parallel, repeatedly or heuristically, or at least some operations may be executed in a different order or omitted or other operations may be added.

Figure 4A:
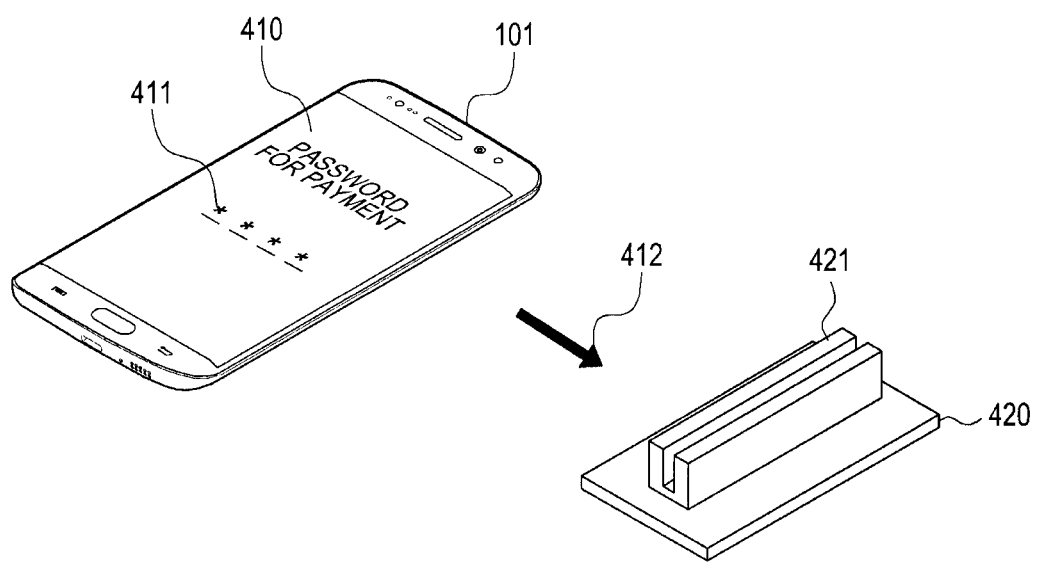
FIG. 4A is a perspective view illustrating an electronic device and a data receiving device according to an embodiment of the present disclosure.

FIG. 4A is a perspective view illustrating an electronic device and a data receiving device according to an embodiment of the present disclosure.

The electronic device 101 may run an electronic payment application and display an execution screen 410 of the electronic payment application on the display. As used herein, the phrase "electronic device 101 performs a particular operation" may mean that the processor 120 included in the electronic device 101 performs the particular operation. As used herein, the phrase "electronic device 101 performs a particular operation" may also mean that the processor 120 included in the electronic device 101 controls other hardware to perform the particular operation. According to an embodiment of the present disclosure, the execution screen 410 of the electronic payment application may include an input window 411 for entry of a password. Although not shown, the electronic device 101 may display a keyboard including a plurality of letter keys on a portion of the display. The user may enter a password by touching the keys of the keyboard, and the electronic device 101 may obtain the letters and/or numbers corresponding to the positions where the touches are detected as a password that the user enters. The electronic device 101 may display generic characters, such as asterisks, for all entered letters or numbers for security purposes on the input window 411. Thus, the user may be provided with visual feedback that his touches on the keyboard have been detected, while others in the vicinity of the electronic device 101 cannot see the entered password. The electronic device 101 may compare the obtained password with a previously stored password. The electronic device 101 may send out payment data when the pre-stored password matches the obtained password. Although FIG. 4A shows that the electronic device 101 sends out payment data based on the password entered by the user, this is merely an example. The electronic device 101 may perform other authentication processes using various types of user biometric information, e.g., fingerprint or iris recognition. Alternatively, the electronic device 101 may perform a multi-factor authentication process that uses both a user input and user's biometric information. When the authentication is complete, the electronic device 101 may send out payment data.

The electronic device 101 may generate a magnetic field 412 that is variable over time and corresponds to the payment data. The electronic device 101 may include a coil capable of generating an induced magnetic field. The electronic device 101 may generate a magnetic field corresponding to payment data by applying a current corresponding to the payment data to the coil. The above-described process for generating magnetic field is described below in greater detail. The data receiving device 420 may include a reading header 421. The reading header 421 may include a coil capable of generating an induced electromotive force from its ambient magnetic field. An induced electromotive force may be generated in the coil of the reading header 421 by the magnetic field 412. The data receiving device 420 may process and analyze the induced electromotive force and obtain the payment data stored in the electronic device 101 as a result of the analysis. The data receiving device 420 may determine whether the payment data matches payment data previously stored and determine whether to authorize the payment based on whether they match. The data receiving device 420 may send the analyzed payment data to another external electronic device. The other external electronic device may determine whether the payment data received from the data receiving device 420 matches payment data previously stored and determine whether to authorize the payment based on whether they match. In this case, the other external electronic device may proceed with the payment through the data receiving device 420 and send a reply as to whether to authorize payment to the data receiving device 420. Using the result of the reply, the data receiving device 420 may output a receipt indicating the authorization of payment or a receipt indicating payment failure when authorization is denied.

Figure 4B:
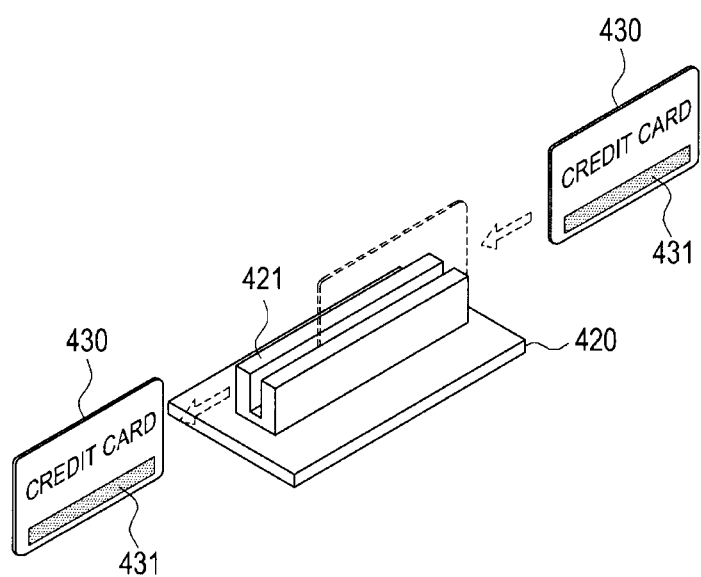
FIG. 4B is a perspective view illustrating an example of payment by a magnetic stripe of a credit card as a comparison to an embodiment of the present disclosure.

FIG. 4B is a perspective view illustrating an example of payment by a magnetic stripe of a credit card as a comparison to an embodiment of the present disclosure. The data receiving device 420 of FIG. 4B may be the same as that shown in FIG. 4A. In FIG. 4B, a credit card 430 may include a magnetic stripe 431. The magnetic stripe 431 may include a plurality of magnetic dipoles. The plurality of magnetic dipoles may be arranged according to unique payment data assigned to the credit card 430. For example, the payment data may be binary data. A first length of dipole may be positioned in a portion of the binary data which corresponds to data "0," and a second length of dipole may be positioned in a portion of the binary data which corresponds to data "1." Meanwhile, as shown in FIG. 4B, the credit card 430 may be inserted and moved in the recess of the reading header 421. The movement of the magnetic stripe 431 may vary the magnetic field surrounding the reading header 421, and thus generate an induced electromotive force in the coil of the reading header 421. The data receiving device 420 may process and analyze the induced electromotive force, and the data receiving device 420 may determine whether to authorize payment using the result of analysis or send the result of analysis to another external electronic device.

As described above, the electronic device 101 of FIG. 4A may generate substantially the same magnetic field 412 as the magnetic field generated by the movement of the magnetic stripe 431 of the credit card 430. Thus, payment data may be transmitted using the existing data receiving device 420 and the electronic device 101. Or in other words, the electronic device 101 can be made to be backwards compatible with existing data receiving device 420. Meanwhile, according to an embodiment of the present disclosure, the electronic device 101 may also generate a magnetic field 412 that is not identical to the magnetic field generated by the movement of the magnetic stripe 431. Or in other words, the electronic device 101 may operate with the data receiving device 420 under a new protocol to transmit payment data. For example, the data receiving device 420 may analyze the induced electromotive force in such a manner as to detect peaks in the obtained induced electromotive force. In this case, the electronic device 101 may generate a magnetic field 412 that includes peaks so that the data receiving device 420 may detect the peaks. The peaks may correspond to the payment data. Accordingly, the electronic device 101 may generate various low-power magnetic fields to transmit payment data. For example, the electronic device 101 may apply various small waveforms of current, e.g., a sinusoidal wave, sawtooth wave, triangular wave, or pulse wave— rather than a relatively large waveform of current, e.g., square wave—to the coil. The electronic device 101 may adjust the waveform applied to the coil so that the data receiving device 420 may receive a magnetic field 412 that includes peaks that represent payment data. This is described below in greater detail. As set forth above, magnetic fields that are generated by relatively small waveforms of current as compared with square waves enable low-power transmission of payment data.

A more detailed description is given below for transmission of payment data by a magnetic field generated by an electronic device and by a credit card stripe.

Figure 5:
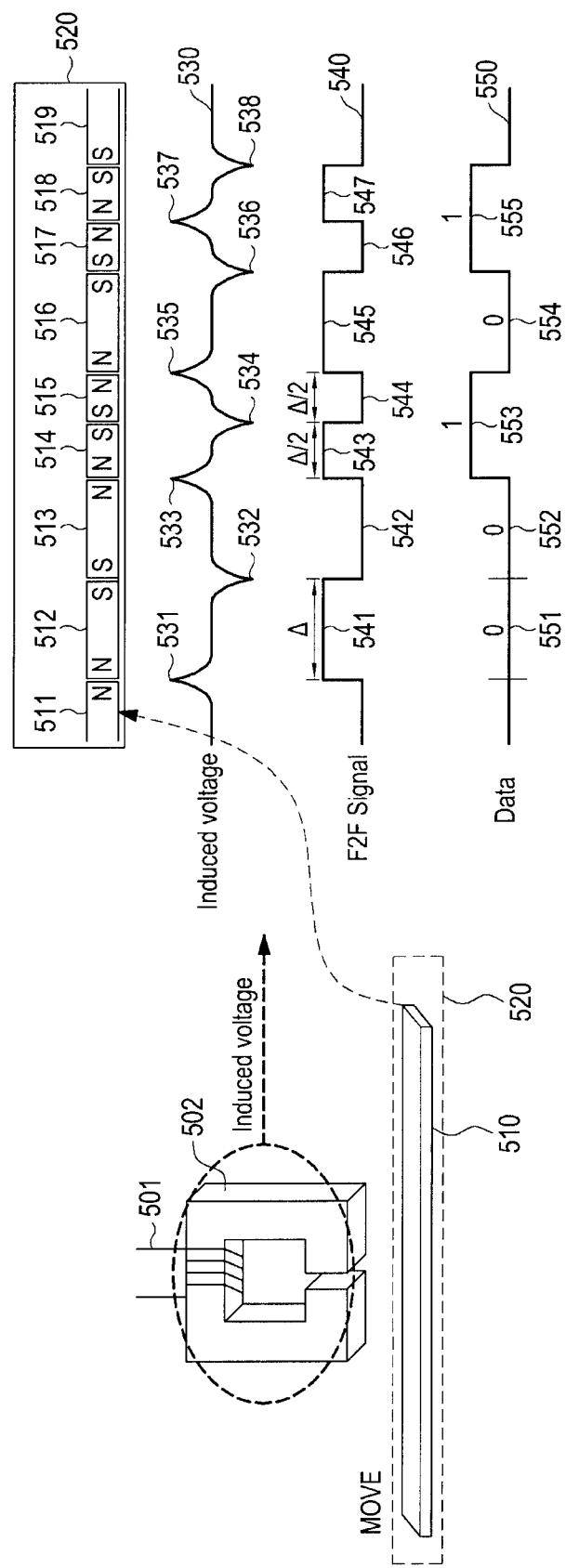
FIG. 5 is a voltage diagram illustrating various waveforms corresponding to a magnetic stripe of a credit card.

FIG. 5 is a voltage diagram illustrating various waveforms corresponding to a magnetic stripe of a credit card.

Referring to FIG. 5, a plurality of magnetic dipoles 511 to 519 may be arranged in the magnetic stripe 510 of the credit card 520. For example, payment data assigned to the credit card 520 may be binary data "00101." Magnetic dipoles 512, 513, and 516 of a first length may correspond to the binary data "0s," and magnetic dipoles 514, 515, 517, and 518 of a second length may correspond to the binary data "1s." Here, for example, the first length may be double the second length. Further, the magnetic dipoles neighboring each other may be arranged so that the same poles are adjacent to each other. For example, the S pole of the second magnetic dipole 512 may be positioned adjacent to the S pole of the third magnetic dipole 513, and the N pole of the third magnetic dipole 513 may be positioned adjacent to meet the N pole of the fourth magnetic dipole 514.

When the magnetic stripe 510 is swiped, an induced voltage may be applied to the coil 501 of the data receiving device 420. The coil 501 may be wound around a ferrite 502 to increase its magnetic flux. The induced voltage 530 may include a plurality of peaks 531 to 538. For example, where the N pole approaches the coil 501, positive peaks 531, 533, 535, and 537 may be induced, and where the S pole approaches, negative peaks 532, 534, 536, and 538 may be induced. The data receiving device 420 may perform frequency/double frequency (F2F) encoding/decoding based on the distance between peaks. The F2F encoding/decoding may assign a first frequency to be "0" a second frequency to be "1," where the second frequency may be double the first frequency. For example, the F2F signal may include sections 541, 542, and 545 in the first frequency and sections 543, 544, 546, and 547 in the second frequency. The sections 541 to 517 may be demarcated by the peaks of the induced voltage 530. The data receiving device 420 may interpret sections 541, 542, and 545 as "0" binary data 551, 552, and 554 and sections 543, 544, 546, and 547 as "1" binary data 553 and 555. The data receiving device 420 may thus obtain data 550, "00101." According to an embodiment of the present disclosure, the electronic device 101 may apply various types of low-power waveforms of current to its coil so that the peaks 531 to 538 corresponding to the payment data may be detected by the data receiving device 420.

Figure 6:
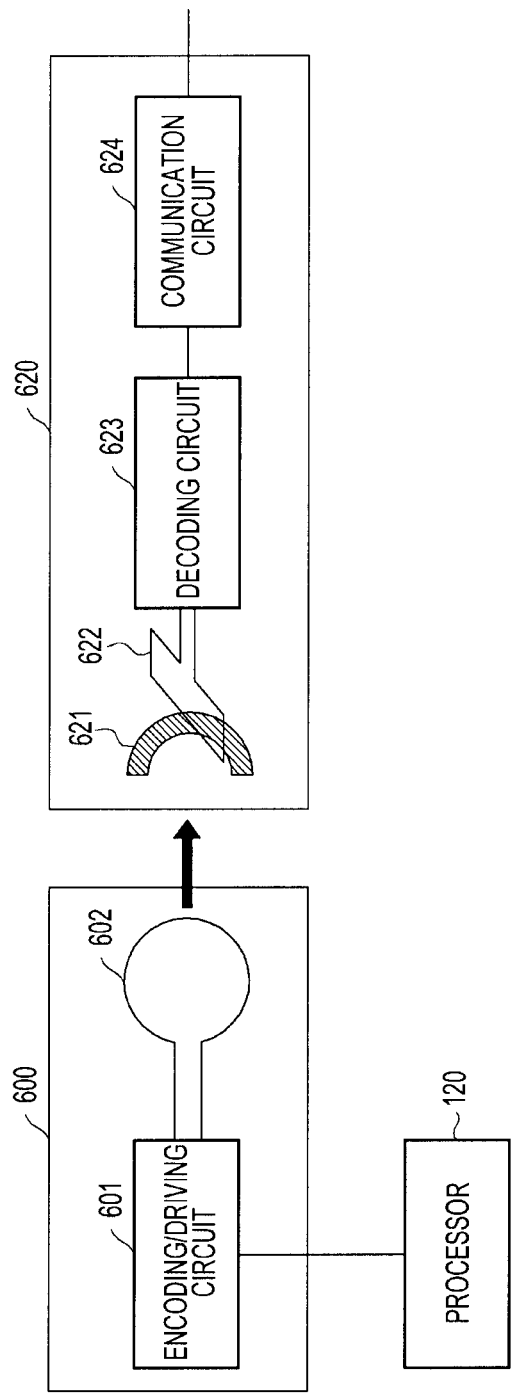
FIG. 6 is a block diagram illustrating a data transmitting circuit according to an embodiment of the present disclosure.

FIG. 6 is a block diagram illustrating a data transmitting circuit according to an embodiment of the present disclosure.

The data transmitting circuit 600 may be included in the electronic device 101 or may be connected to the electronic device 101 via a wired or wireless connection. The data transmitting circuit 600 may include an encoding/driving circuit 601 and a coil 602.

The processor 120 may provide payment data stored in, e.g., the memory 130 to the encoding/driving circuit 601. When a payment application is executed and a preset authentication process is completed, the processor 120 may provide payment data to the encoding/driving circuit 601. The encoding/driving circuit 601 may encode the received payment data in a preset scheme, e.g., the F2F scheme. The encoding/driving circuit 601 may convert the payment data into suitable binary data and generate a waveform corresponding to the converted binary data using the preset encoding scheme. Alternatively, the processor 120 may provide the suitable binary data format of payment data to the encoding/driving circuit 601, in which case the encoding/driving circuit 601 may omit the conversion.

According to an embodiment of the present disclosure, the processor 120, upon detecting a data receiving device 620 or coil 622, controls the data transmitting circuit 600 to generate a magnetic field. For example, the processor 120 may control the data transmitting circuit 600 to generate a magnetic field when the data receiving device 620 is near the electronic device 101 or is within a predetermined distance from the electronic device 101.

The processor 120 may determine a condition for generating a magnetic field corresponding to the distance between the data receiving device 620 and the electronic device 101. For example, the processor 120 may determine at least one of the data rate of the payment data, strength of magnetic field, and transmission count corresponding to the distance to the data receiving device 620. "Transmission count" may indicate the number of transmissions of the data determined by the electronic device 101.

According to an embodiment of the present disclosure, the encoding/driving circuit 601 may generate various waveforms (e.g., sinusoidal waveform) of current corresponding to the payment data. For example, the encoding/driving circuit 601 may generate a sinusoidal wave having a first frequency corresponding to the "0" binary data of the payment data and a sinusoidal wave having a second frequency corresponding to the "1" binary data of the payment data. The current outputted from the encoding/driving circuit 601 may be delivered to the coil 602. The coil 602 may generate a magnetic field induced by the current. The magnitude of the sinusoidal wave applied to the coil 602 may vary over time, and the variation in current may induce the magnetic field. The coil 602 may be implemented as a spiral coil, a solenoid coil, a toroid coil, etc. The encoding/driving circuit 601 may also include an amplifier to amplify signals.

The induced magnetic field, which is variable over time, in turn induces an electromotive force in the coil 622 of the data receiving device 620. The coil 622 may be wound around a ferrite 621 for increasing magnetic flux. The induced electromotive force, e.g., an induced voltage, generated in the coil 622 may be decoded by a decoding circuit 623. For example, the decoding circuit 623 may detect peaks of the induced electromotive force and use the intervals between the peaks to generate binary data. For example, as shown above, the decoding circuit 623 may interpret intervals of a first frequency as a "0" and intervals of a second frequency as a "1."

A communication circuit 624 may transmit the result of the decoding to another external electronic device. The transmission may be done using a wired or wireless connection. The external electronic device may determine whether the payment succeeds or fails depending on the received result of the decoding and send a reply as to whether the payment succeeded or failed to the data receiving device 620. The data receiving device 620 may perform an event corresponding to the success in payment or an event corresponding to the failure of payment. Alternatively, according to another embodiment of the present disclosure, the data receiving device 620 may include a processor that may determine whether the payment succeeds or fails. As described above, according to an embodiment of the present disclosure, the data transmitting circuit 600 applies a relatively small magnitude of current (e.g., a sinusoidal waveform of current) to the coil 602, and thus, the power used for transmission of payment data may be relatively low. Accordingly, power consumption used for transmission of data may be reduced. The encoding/driving circuit 601 may apply various waveforms of low-power current to the coil 602, and it is appreciated by one of ordinary skill in the art that the disclosed low-power waveforms are not limited to sinusoidal waves.

Figure 7:
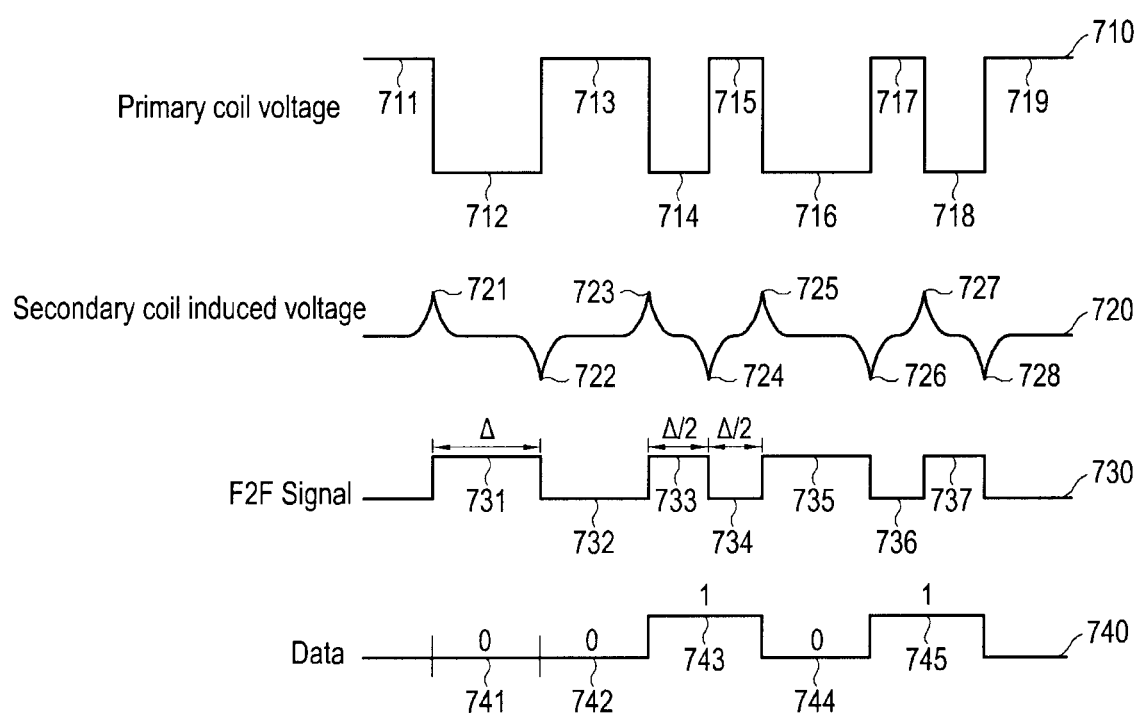
FIG. 7 is a voltage diagram illustrating a signal obtained by applying a square wave as a comparison to an embodiment of the present disclosure.

FIG. 7 is a voltage diagram illustrating a signal obtained by applying a square wave as a comparison to an embodiment of the present disclosure.

According to an embodiment, an electronic device may apply a square waveform of voltage 710 to the primary coil, the primary coil being the coil of the electronic device, for example coil 602. The voltage 710 may include high signals 711, 713, 715, 717, and 719 and low signals 712, 714, 716, and 718. The frequencies of the high signals 711, 713, 715, 717, and 719 and low signals 712, 714, 716, and 718 may be set according to whether the signals correspond to a "0" or "1."

Figure 8A:
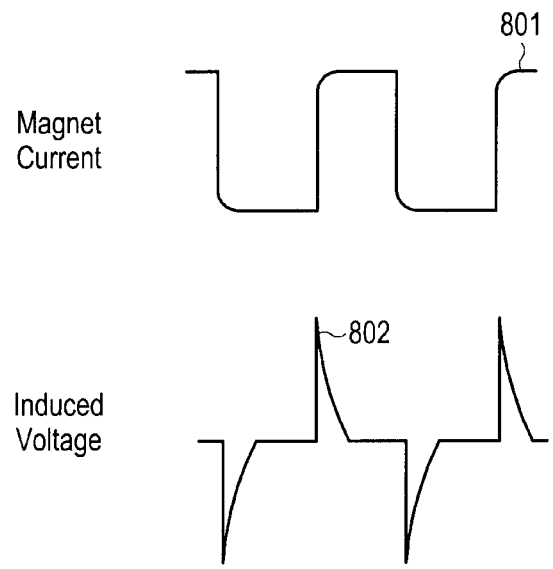
FIG. 8A and FIG. 8B are voltage diagrams illustrating square waveforms or trapezoidal waveforms.
Figure 8B:
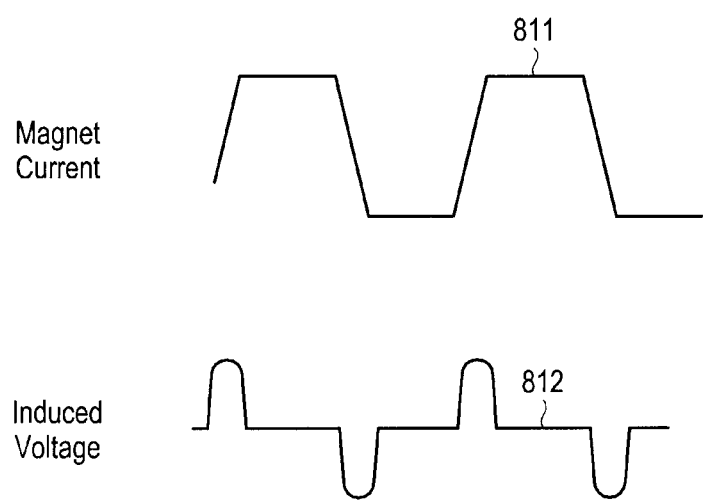
Figure 8C:
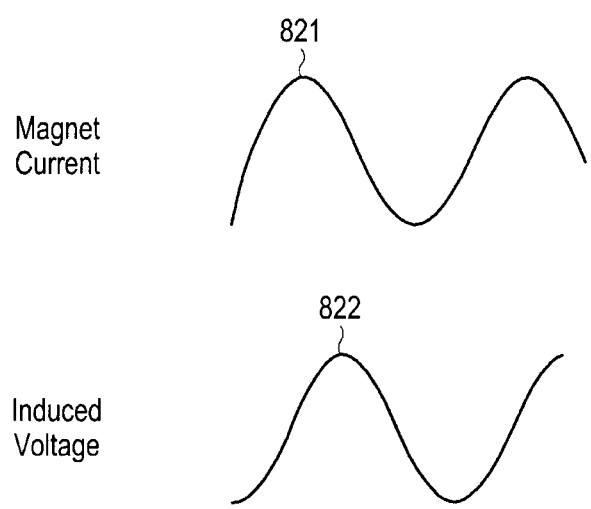
FIG. 8C, FIG. 8D and FIG. 8E are voltage diagrams illustrating sinusoidal waves.
Figure 8D:
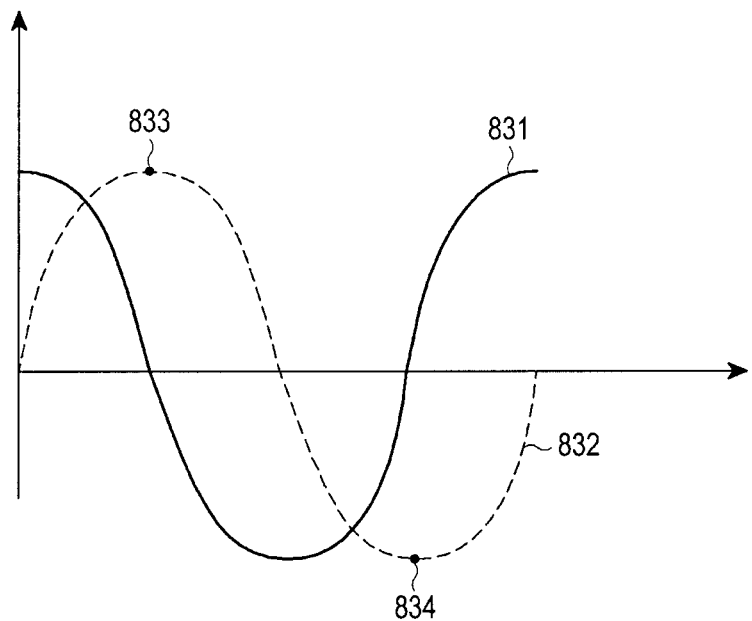

A voltage 720 induced in a secondary coil included in the data receiving device may include a plurality of peaks 721 to 728. In other words, the electronic device may apply a square waveform of voltage 710 so that the voltage induced in the secondary coil of the data receiving device may have peaks. The data receiving device may obtain an F2F signal 730 based on the intervals between the peaks 721 to 728. The F2F signal 730 may include a plurality of sub signals 731 to 737 that correspond to the intervals between the peaks 721 to 728. The data receiving device may obtain "0" or "1" binary data 741 to 745 based on the time length, i.e. frequencies of the sub signals 731 to 737 of the F2F signal. Meanwhile, the electronic device according to an embodiment of the present disclosure may apply square or trapezoidal waveforms 801 or 811 to the primary coil as shown in FIGS. 8A and 8B, and voltage or current 802 or 812, which includes peaks as shown, may be induced in the secondary coil. Alternatively, according to an embodiment of the present disclosure, the electronic device 101 may apply a sinusoidal waveform of voltage 821, as shown in FIG. 8C, to the primary coil, thus generate a sinusoidal magnetic field. The data receiving device 420 may detect the induced voltage 822. More specifically, the electronic device 101 may apply a sinusoidal waveform of voltage or current 831 to the primary coil as shown in FIG. 8D. The applied sinusoidal waveform may be represented by Equation 1:

$$y = A\cos(2\pi ft) \qquad \text{[Equation 1]}$$

Figure 8E:
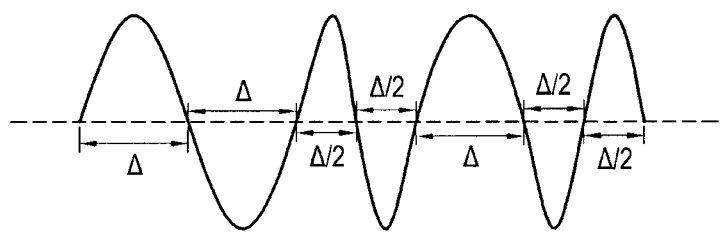

A may refer to the amplitude of the current applied to the primary coil, and f may refer to the frequency of the current. According to an embodiment of the present disclosure, the electronic device 101 may adjust frequency f according to the binary data of the payment data. For example, the electronic device 101 may set f to a first frequency to represent "0" and to a second frequency to represent "1." The second frequency may be double the first frequency. For example, the electronic device 101 may apply a sinusoidal waveform of current as shown in FIG. 8E to the primary coil to represent the binary data "00101."

A sinusoidal waveform of induced electromotive force 832 may be induced in the secondary coil. For example, the induced electromotive force 832 may be represented in Equation 2.

$$y' = B\sin(2\pi ft) \qquad \text{[Equation 2]}$$

In Equation 2 above, B may refer to the amplitude of the induced electromotive force induced in the secondary coil. f in Equation 2 may be the same as f in Equation 1. In other words, the induced electromotive force induced in the secondary coil may have substantially the same frequency as the frequency of the waveform applied to the primary coil. Accordingly, the data receiving device including the secondary coil may interpret the data based on the time distance between the peaks 833 and 834 of the induced electromotive force 832. For example, where the frequency is the first frequency, the time distance between the peaks 833 and 834 may be a first distance, and where the frequency is the second frequency, the time distance between the peaks 833 and 834 may be a second distance. Like the first and second frequencies, the first distance may be double the second distance. The data receiving device may decode the data based on the inter-peak distances in the same manner as the conventional art.

Figure 8F:
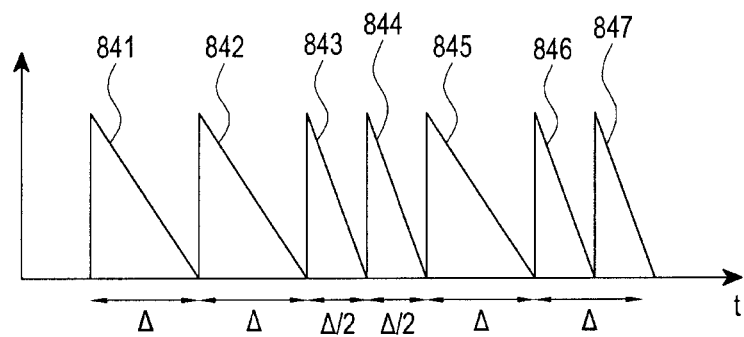
FIG. 8F, FIG. 8G and FIG. 8H are diagrams illustrating current or voltage waveforms that are applied to various types of primary coils according to embodiments of the present disclosure.
Figure 8G:
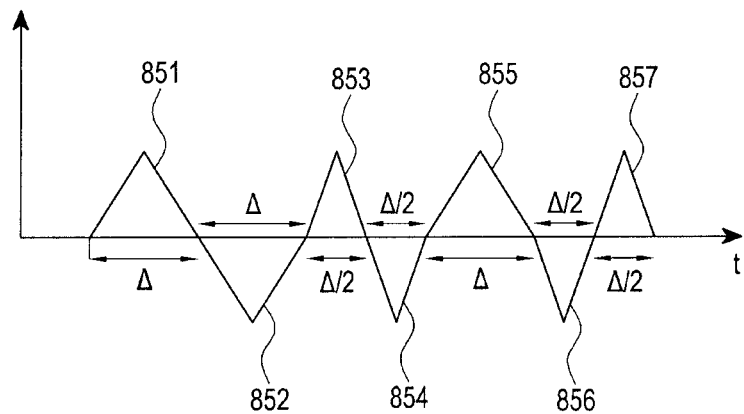
Figure 8H:
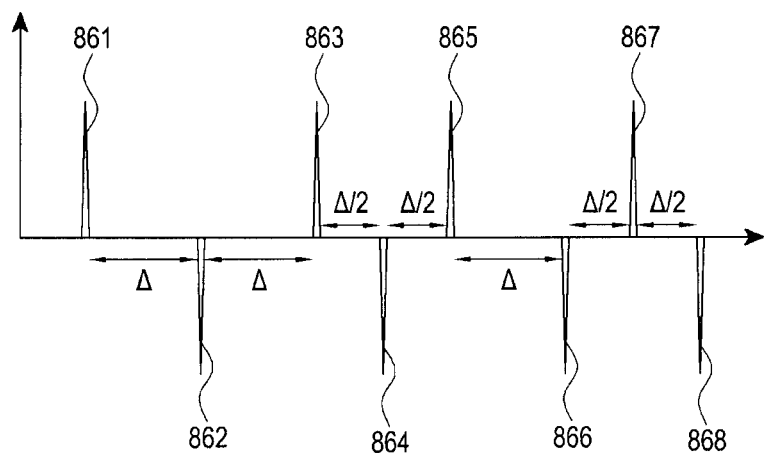

FIGS. 8F to 8H are diagrams illustrating current or voltage waveforms applied to various types of primary coils according to embodiments of the present disclosure.

Referring to FIG. 8F, the electronic device 101 may apply a plurality of sawtooth waveforms of current or voltage 841 to 847 to the primary coil. For example, the electronic device 101 may apply sawtooth waveforms of current or voltage 841, 842, and 845, which have a first time length Δ, to the primary coil. The waveforms of the first time length Δ may correspond to "0" binary data. Similarly, sawtooth waveforms of current or voltage 843, 844, 846, and 847, which have a second time length Δ/2, may correspond to "1" binary data. Sawtooth waves are more advantageous than the square waves that conventional electronic devices adopt, at least because sawtooth waves use less power.

Referring to FIG. 8G, the electronic device 101 may apply a plurality of triangular waveforms of current or voltage 851 to 857 to the primary coil. For example, the electronic device 101 may apply triangular waveforms of current or voltage 851, 852, and 855, which have a first time length Δ, to the primary coil. The waveforms of the first time length Δ may correspond to "0" binary data. Similarly, triangular waveforms of current or voltage 853, 854, 856, and 857, which have a second time length Δ/2, may correspond to "1" binary data. Triangular waves are also more advantageous than the square waves that conventional electronic devices adopt, at least because triangular waves use less power.

Referring to FIG. 8H, the electronic device 101 may apply a plurality of pulse waveforms of current or voltage 861 to 868 to the primary coil. For example, the electronic device 101 may generate a pulse wave so that the time interval between the pulse wave and its previous pulse wave is a first time length Δ. The first time length Δ may correspond to "0" binary. Similarly, pulse waves where the time interval between the pulse wave and its previous pulse wave is a second time length Δ/2 may correspond to "1" binary data. For example, as shown in FIG. 8H, the electronic device 101 may apply a pulse wave 862 after the first time length Δ after the pulse wave 861 to represent "0." Likewise, the electronic device 101 may apply a pulse wave 864 the second time length Δ/2 after the pulse wave 863 and a pulse wave 865 the second time length Δ/2 after the pulse wave 864 to represent "1." Pulse waves are also more advantageous than the square waves that conventional electronic devices adopt, at least because pulse waves use less power.

Various waveforms of current or voltage, other than those described above, may be applied to the primary coil at various frequency or time intervals corresponding to the payment data. It will readily be appreciated by one of ordinary skill in the art that any waveforms may be used as long as they induce peaks in the data receiving device and consume less power than conventionally adopted square waves.

Figure 9:
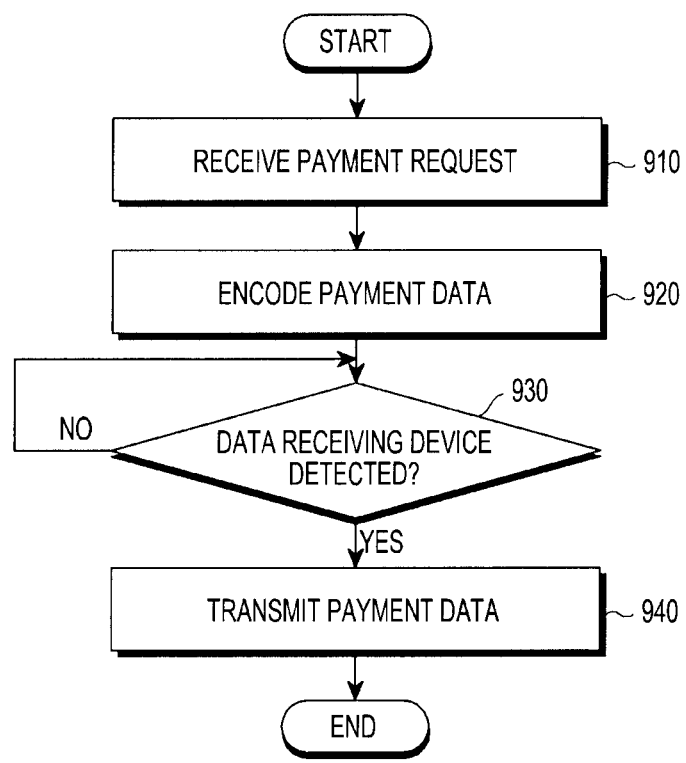
FIG. 9 is a flowchart illustrating a method for controlling an electronic device according to an embodiment of the present disclosure.

FIG. 9 is a flowchart illustrating a method for controlling an electronic device according to an embodiment of the present disclosure.

In operation 910, the electronic device 101 may receive a payment request. The electronic device 101 may receive the payment request after authentication was successfully completed, e.g., after the user enters the correct password. Alternatively, the electronic device 101 may detect a payment request event. For example, the electronic device 101 may detect a payment request event when a payment application is executed, a payment request icon in the payment application is selected, and user authentication is completed.

In operation 920, the electronic device 101 may encode payment data. For example, the electronic device 101 may convert the payment data into suitable binary data and identify a waveform for each value of the binary data.

In operation 930, the electronic device 101 may determine whether a data receiving device is detected. In operation 940, the electronic device 101 may transmit the payment data upon detecting a data receiving device. In other words, upon detecting the data receiving device, the electronic device 101 may apply a voltage or current waveform corresponding to the binary data to the coil, and the coil may generate a magnetic field using the applied voltage or current. The data receiving device may receive an induced electromotive force and obtain the payment data based on the result of interpreting the induced electromotive force. In other words, the electronic device 101 may generate the magnetic field corresponding to the payment data only upon detecting a data receiving device. This allows the electronic device 101 to save power. According to an embodiment of the present disclosure, the data receiving device is detected by the electronic device 1010 when the data receiving device may seamlessly detect peaks in the magnetic field generated by the electronic device 101 even when the magnetic field is of relatively low power. In other words, according to an embodiment of the present disclosure, the electronic device 101 may generate a magnetic field upon determining that the data receiving device is in a position suitable for data transmission, rather than generating the magnetic field simply and immediately upon detecting the data receiving device. The data receiving device may be detected based on the voltage, current, power, or impedance detected in a coil of the electronic device 101, the magnetic field sensed by a magnetic sensor of the electronic device 101, or based on images of the reading header of the data receiving device captured by the electronic device 101, which is described below in greater detail. Meanwhile, the electronic device 101 may determine conditions for transmission of data corresponding to the position of the data receiving device with respect to the electronic device 101. This is also described below in greater detail.

Figure 10:
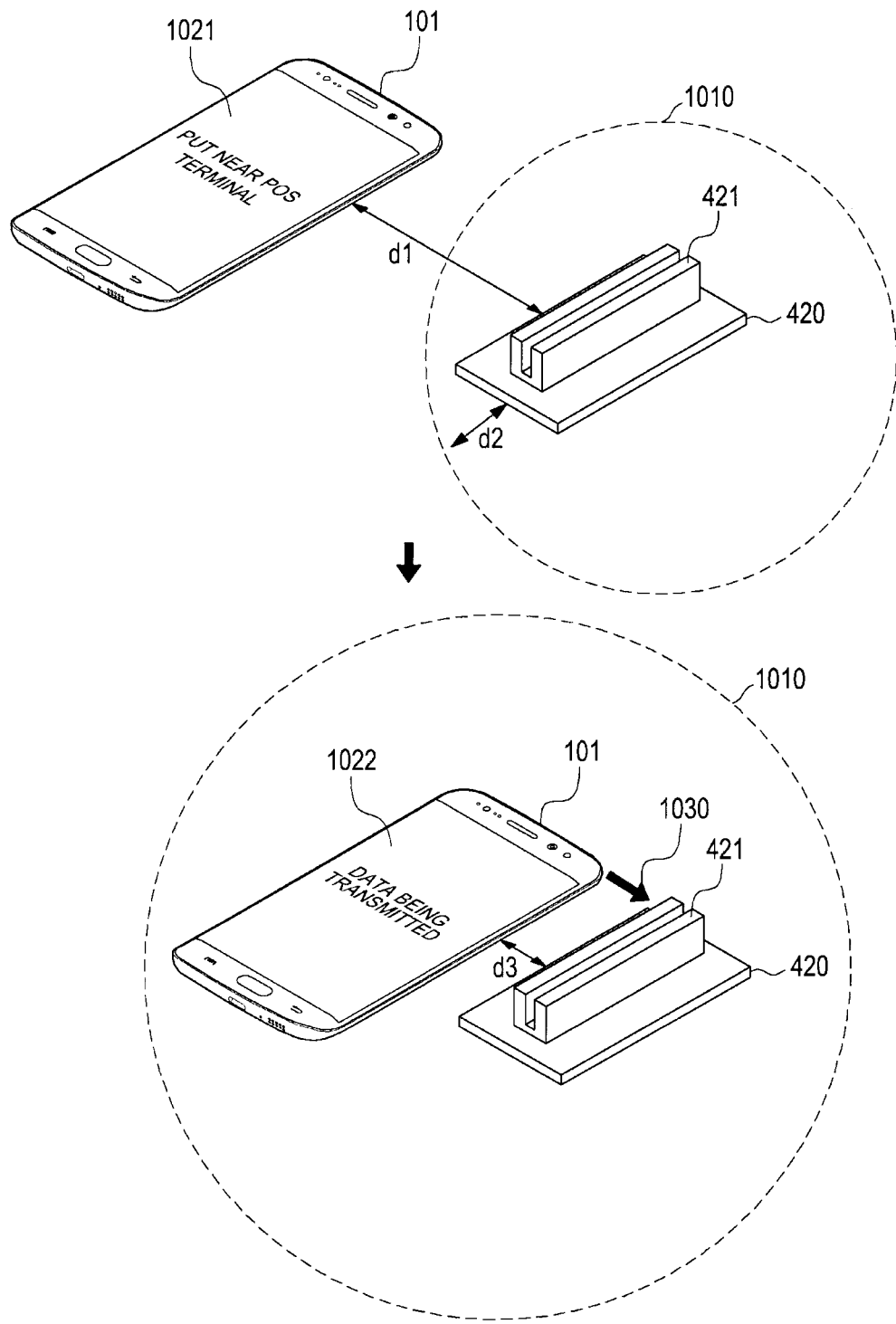
FIG. 10 is a perspective view illustrating an electronic device and a data receiving device according to an embodiment of the present disclosure.

FIG. 10 is a perspective view illustrating an electronic device and a data receiving device according to an embodiment of the present disclosure.

Referring to FIG. 10, the electronic device 101 may be disposed a first distance d1 apart from the data receiving device 420. In this case, the electronic device 101 may fail to detect the data receiving device 420. Where the electronic device 101 and the data receiving device 420 are spaced apart from each other at the first distance d1, the electronic device 101 may determine that the condition for detection of the data receiving device is not met. For example, where the electronic device 101 is placed within a second distance d2, the data receiving device may properly perform peak detection even with a relatively low powered magnetic field. Just precisely how much power must be in the magnetic field to enable data transmission may be determined experimentally. Accordingly, the condition for detecting a data receiving device may be that the distance between the data receiving device 420 and the electronic device 101 is within the preset second distance d2. Upon determining that no data receiving device is detected, the electronic device 101 may abstain from transmitting the payment data even when receiving the payment request. For example, the electronic device 101 may display a message 1021 for inducing the user to move the electronic device 101 while delaying the transmission of the payment data.

Meanwhile, when the electronic device 101 is positioned away from the data receiving device 420 at a third distance d3 which is shorter than the second distance d2, the electronic device 101 may determine that the condition for detection of the data receiving device is met. In other words, the electronic device 101 may detect the data receiving device 420. In response to the detection of the data receiving device 420, the electronic device 101 may generate a magnetic field 1030 corresponding to the payment data. For example, the electronic device 101 may display a message 1022 indicating the transmission of payment data. As set forth above, the electronic device 101 may generate a magnetic field only when the condition for detecting a data receiving device is met. Accordingly, when the electronic device 101 and the data receiving device 420 are positioned apart from each other at the first distance d1, i.e. when data cannot be reliably transmitted, unnecessary generation of a magnetic field may be avoided, preventing power waste of the electronic device 101.

Figure 11:
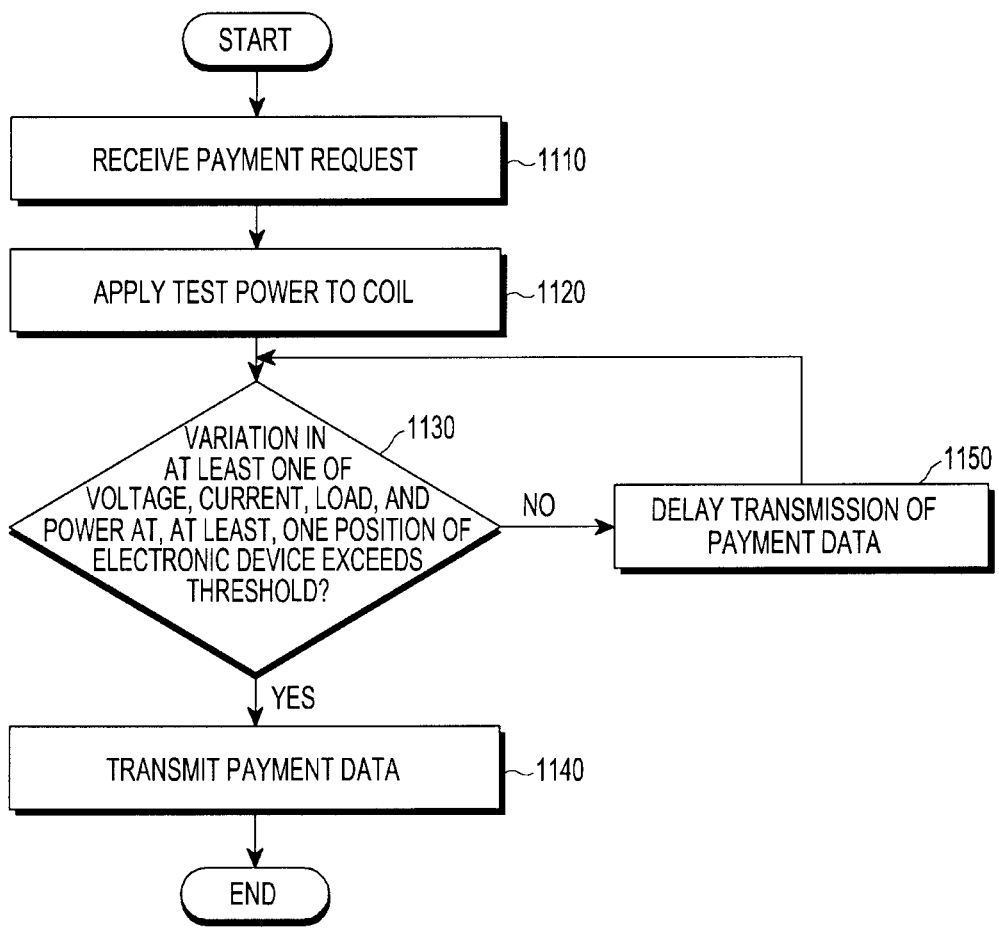
FIG. 11 is a flowchart illustrating a method for controlling an electronic device according to an embodiment of the present disclosure.
Figure 12:
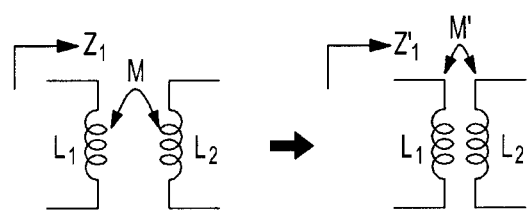
FIG. 12 is a circuit diagram illustrating an electronic device and a data receiving device according to an embodiment of the present disclosure.

FIG. 11 is a flowchart illustrating a method for controlling an electronic device according to an embodiment of the present disclosure. The embodiment related to FIG. 11 is described in greater detail with reference to FIG. 12. FIG. 12 is a circuit diagram illustrating an electronic device and a data receiving device according to an embodiment of the present disclosure;

In operation 1110, the electronic device 101 may receive a payment request. In operation 1120, test power may be applied to the coil. The test power may be power for detecting a data receiving device, e.g., a preset magnitude of current or voltage. The test power may have a relatively high magnitude of voltage or current as compared with that used for generating the magnetic field for data transmission.

In operation 1130, the electronic device 101 may determine whether a variation in at least one of voltage, current, load, and magnitude of power at, at least, one position in the electronic device 101 exceeds a threshold. For example, as shown in FIG. 12, the electronic device 101 may include a primary coil L1, and a data receiving device 420 may include a secondary coil L2. Meanwhile, when the primary coil L1 and the secondary coil L2 are positioned adjacent to each other, the primary coil L1 and the secondary coil L2 may be magnetically coupled together, generating a mutual inductance M.

Where the data receiving device 420 is sufficiently far away from the electronic device 101, if the test power is applied to the primary coil L1, a first current may flow through the primary coil L1. The impedance of the primary coil L1 may be measured as Z0. Meanwhile, since there is mutual inductance M when the data receiving device 420 is positioned around the electronic device 101 as described above, if the test power is applied to the primary coil L1 when the data receiving device 420 is positioned around the electronic device 101, a second current different from the first current may flow through the primary coil L1. Thus, the impedance of the primary coil L1 may be measured as Z1. Like the variations in current and impedance, when there is mutual inductance M, the electronic device 101 may also detect variations in voltage and power in the primary coil L1. Where the distance between the electronic device 101 and the data receiving device 420 is relatively large, the mutual inductance M may be relatively small, so that the variations in current, voltage, power, or impedance caused by mutual inductance M may be relatively small.

As the primary coil L1 comes relatively close to the secondary coil L2, the mutual inductance M' may relatively increase. As the mutual inductance M' increases, if the test power is applied to the primary coil L1, a third current may flow through the primary coil L1. At this point, the impedance of the primary coil L1 may be measured as Z1'. Where the distance between the electronic device 101 and the data receiving device 420 is relatively small, the mutual inductance M' may be relatively large, so that the difference in current, voltage, power, or impedance may be relatively large. Thus, depending on how close the data receiving device 420 is to the electronic device 101, the electronic device 101 may detect variations in the current, voltage, power, and load at its primary coil L1. When the variations exceed predetermined thresholds, the electronic device 101 may determine that the data receiving device 420 is positioned sufficiently close to the electronic device 101.

Upon determining that the measured variation exceeds the threshold, the electronic device 101 may transmit the payment data in operation 1140. Upon determining that the measured variation does not exceed the threshold, the electronic device 101 may delay the transmission of the payment data in operation 1150.

Figure 13:
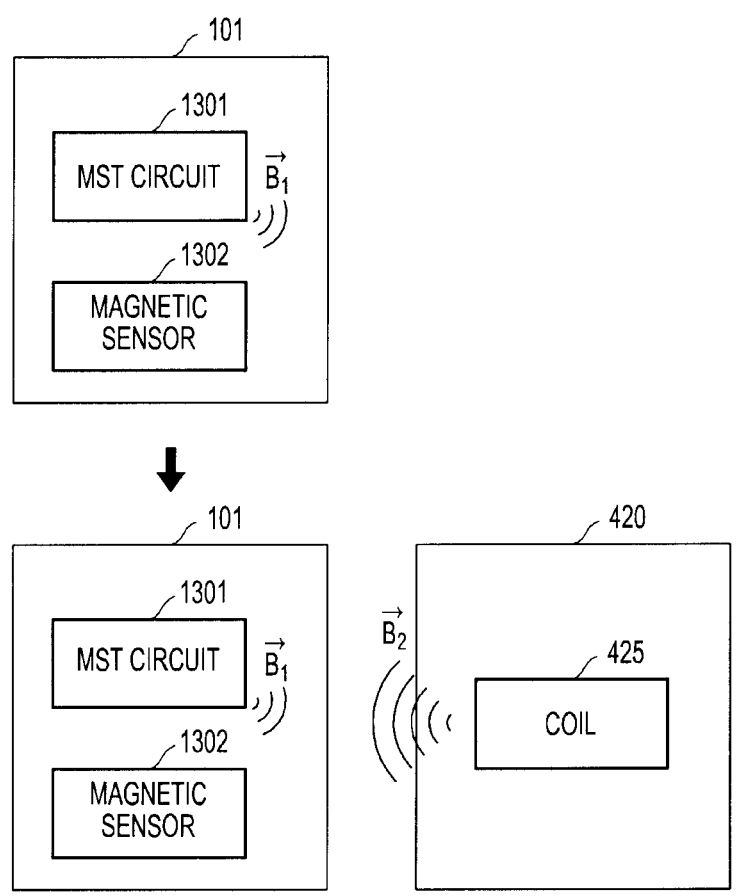
FIG. 13 is a block diagram illustrating an electronic device and a data receiving device according to an embodiment of the present disclosure.
Figure 14:
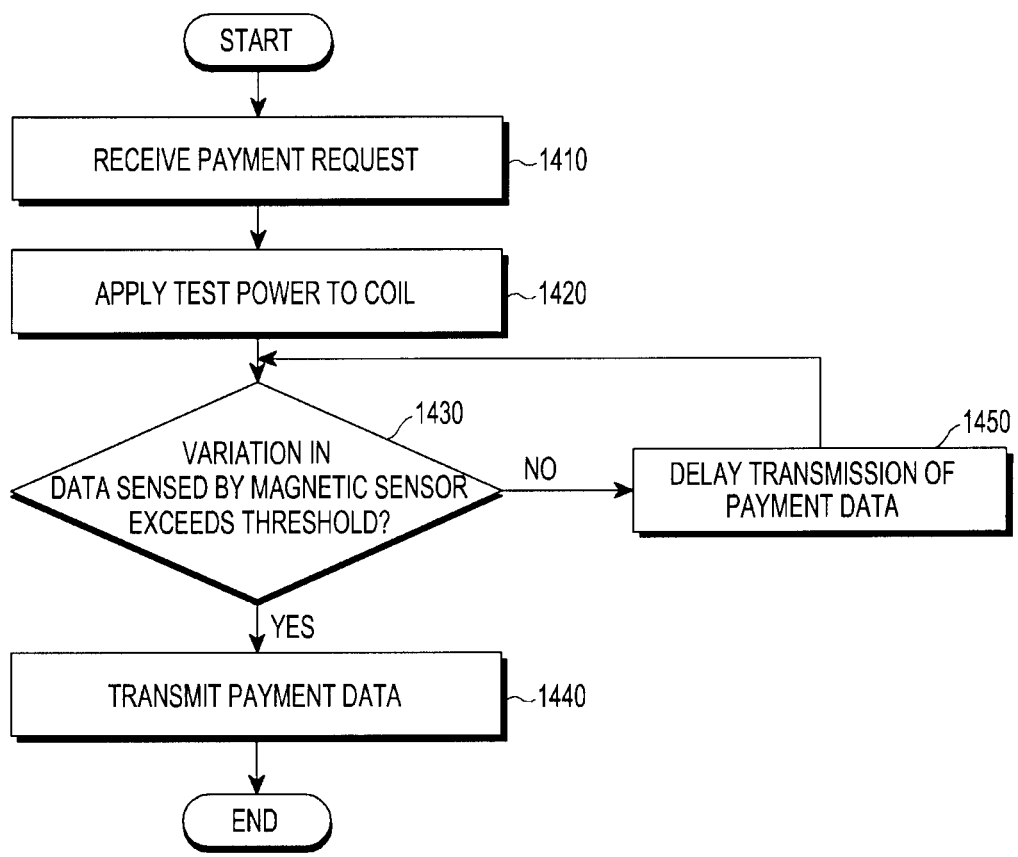
FIG. 14 is a flowchart illustrating a method for controlling an electronic device according to an embodiment of the present disclosure.

FIG. 13 is a block diagram illustrating an electronic device and a data receiving device according to an embodiment of the present disclosure. The embodiment related to FIG. 13 is described in greater detail with reference to FIG. 14. FIG. 14 is a flowchart illustrating a method for controlling an electronic device according to an embodiment of the present disclosure.

Referring to FIG. 13, according to an embodiment of the present disclosure, the electronic device 101 may include an MST circuit 1301 for generating magnetic field corresponding to payment data and a magnetic sensor 1302. The MST circuit 1301 may be implemented as, e.g., the data transmitting circuit 600 of FIG. 6. The MST circuit 1301 may generate magnetic field corresponding to payment data upon detecting a data receiving device 420 or secondary coil 425. Meanwhile, the magnetic sensor 1302 may sense the strength of its ambient magnetic field.

In operation 1410, the electronic device 101 may receive a payment request. In operation 1420, the electronic device 101 may apply test power to the coil. In this case, the MST circuit 1301 may generate a first magnetic field B1 which is induced by the test power as shown in FIG. 13. The magnetic sensor 1302 may sense the first magnetic field B1.

In operation 1430, the electronic device 101 may determine whether a variation in data sensed by the magnetic sensor exceeds a threshold. For example, as shown in FIG. 13, the secondary coil 425 may generate a second magnetic field B2 when the data receiving device 420 or the secondary coil 425 is positioned around the electronic device 101. The second magnetic field B2 may be generated by an electromotive force induced by the first magnetic field B1 in the secondary coil 425. Accordingly, the magnetic sensor 1302 may in this scenario, rather than sensing only the first magnetic field B1, sense the vector sum of the second magnetic field B2 and the first magnetic field B1. As a result, the data sensed by the magnetic sensor 1302 may be different when the data receiving device 420 is nearby versus when the data receiving device 420 is far away. In particular, when the data receiving device 420, i.e., the secondary coil 425, is positioned closer to the electronic device 101, the data sensed by the magnetic sensor 1302 may be significantly different than the data sensed by the magnetic sensor 1302 when the data receiving device 420 is not near the electronic device 101. As such, when the variation in the data sensed by the magnetic sensor exceeding a threshold, it may indicate that the data receiving device 420 is positioned sufficiently close to the electronic device 101.

Upon determining that the variation in the data sensed by the magnetic sensor exceeds the threshold, the electronic device 101 may transmit the payment data, i.e., generate the magnetic field corresponding to the payment data, in operation 1440. Upon determining that the variation in the data sensed by the magnetic sensor does not exceed the threshold, the electronic device 101 may delay the transmission of the payment data in operation 1450.

Figure 15:
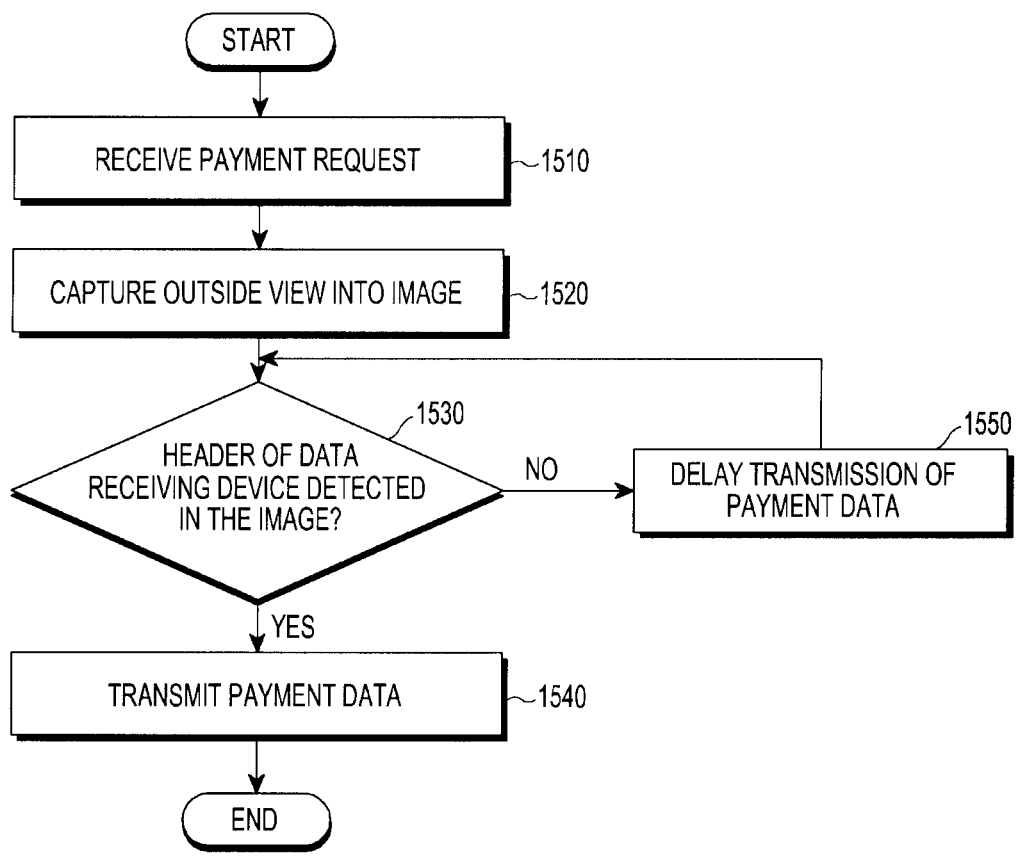
FIG. 15 is a flowchart illustrating a method for controlling an electronic device according to an embodiment of the present disclosure.

FIG. 15 is a flowchart illustrating a method for controlling an electronic device according to an embodiment of the present disclosure.

In operation 1510, the electronic device 101 may receive a payment request. In operation 1520, the electronic device 101 may capture an image of the surrounding of the electronic device 101, for example by using a camera. In operation 1530, the electronic device 101 may determine whether the reading header of a data receiving device is in the image. When the header is detected, the electronic device 101 may transmit payment data in operation 1540. But if the header is not detected, the electronic device 101 may delay the transmission of payment data in operation 1550. The electronic device 101 may store in its memory images of various reading headers. The electronic device 101 may identify the reading header by comparing the portions of the captured image to these images stored in the memory. The electronic device 101 may further determine the distance between the electronic device 101 and the reading header by analyzing the size of the reading header in the image. The electronic device 101 may be configured to transmit payment data when the size of the reading header exceeds a preset threshold.

Alternatively, the electronic device 101 may detect the reading header using edge detection of the image. For example, the reading header may be made of plastic, while the rest of the data receiving device may be made of metal. The difference in brightness between the pixels corresponding to plastic in the captured image and the pixels corresponding to metal in the captured image may be relatively large. Thus, the electronic device 101 may detect the reading header by detecting a transition in the brightness of pixels that is relatively large.

Meanwhile, according to other embodiments of the present disclosure, the electronic device 101 may also detect the data receiving device 420 using various other means, such as using proximity sensors, infrared (IR) sensors, etc.

Figure 16:
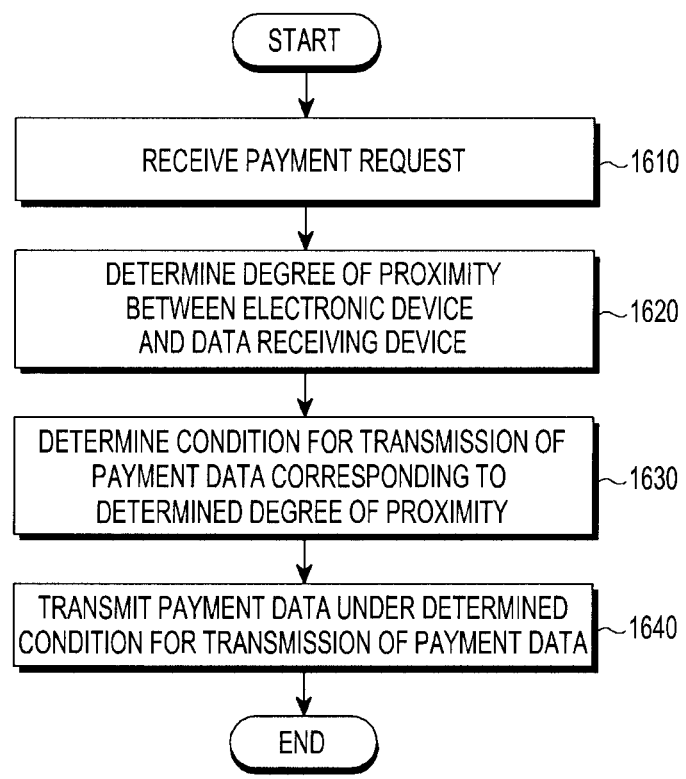
FIG. 16 is a flowchart illustrating a method for controlling an electronic device according to an embodiment of the present disclosure.

FIG. 16 is a flowchart illustrating a method for controlling an electronic device according to an embodiment of the present disclosure.

In operation 1610, the electronic device 101 may receive a payment request. In operation 1620, the electronic device 101 may determine the degree of proximity between the electronic device 101 and the data receiving device 420. In operation 1630, the electronic device 101 may determine the condition for transmitting payment data corresponding to the determined degree of proximity.

According to an embodiment of the present disclosure, upon receipt of a payment request, the electronic device 101 may apply test power to the coil in the electronic device 101. As set forth above in connection with FIGS. 11 and 12, when the data receiving device 420 is not positioned nearby, if the test power is applied to the coil, the first current, first voltage, first power, or impedance Z0 may be measured in the coil. Meanwhile, where the data receiving device 420 is positioned relatively far away, if the test power is applied to the coil, the second current, second voltage, second power, or impedance Z1 may be measured in the coil. Where the data receiving device 420 is positioned relatively close, if the test power is applied to the coil, the third current, third voltage, third power, or impedance Z1' may be measured in the coil. As described above, since the values measured are varied depending on the distance between the data receiving device 420 and the electronic device 101, the electronic device 101 may determine the distance between the electronic device 101 and the data receiving device 420 based on the result of the measurements. For example, the electronic device 101 may store information about the correlations between the distance between the electronic device 101 and the data receiving device 420 and electrical values measured in the coil upon applying the test power. These correlations are shown in Table 1 below:

TABLE 1

| Electronic device-data receiving device distance | Electrical values measured in coil |
| --- | --- |
| Where no data receiving device is positioned | Current: I1<br>Voltage: V1<br>Power: P1<br>Impedance: Z1 |
| X1 | Current: I2<br>Voltage: V2<br>Power: P2<br>Impedance: Z2 |
| X2 | Current: I3<br>Voltage: V3<br>Power: P3<br>Impedance: Z3 |

For example, when the test power is applied to the coil, the electronic device 101 may measure the voltage applied to the coil as V2. Using the above correlation, the electronic device 101 may determine that the degree of proximity is X1, in other words, the data receiving device is X1 distance away from the electronic device. The electronic device 101 may determine the conditions for the transmission of data corresponding to the degree of proximity. For example, the electronic device 101 may determine a data transmission count corresponding to the degree of proximity. When the degree of proximity is relatively low, i.e. when the data receiving device is relatively close, the electronic device 101 may set the data transmission count to be relatively small. The electronic device 101 may also determine a data rate or baud rate corresponding to the degree of proximity. For example, where the degree of proximity is relatively low, the electronic device 101 may set the data rate or baud rate to be relatively large. The electronic device 101 may also determine the magnitude of current or voltage applied to the coil corresponding to the degree of proximity. For example, where the degree of proximity is relatively low, the electronic device 101 may set the magnitude of current or voltage to be relatively small. It will readily be appreciated by one of ordinary skill in the art that adjustment of the data transmission count, data rate, or the magnitude of current or voltage applied to the coil depending on the degree of proximity stated above are merely examples.

The electronic device 101 may also determine the degree of proximity using the degree of variations in the electrical values measured. For example, the electronic device 101 may store information about the correlations between the distance between the electronic device 101 and the data receiving device 420 and the degrees of variation in the electrical values, as shown in Table 2 below:

TABLE 2

| Electronic device-data receiving device distance | Degree of variation in electrical value measured in coil |
|---|---|
| Where no data receiving device is positioned | Degree of variation in current: 0<br>Degree of variation in voltage: 0<br>Degree of variation in power: 0<br>Degree of variation in impedance: 0 |
| X1 | Degree of variation in current: ΔI1<br>Degree of variation in voltage: ΔV1<br>Degree of variation in power: ΔP1<br>Degree of variation in impedance: ΔZ1 |
| X2 | Degree of variation in current: ΔI2<br>Degree of variation in voltage: ΔV2<br>Degree of variation in power: ΔP2<br>Degree of variation in impedance: ΔZ2 |

For example, when the test power is applied to the coil, the electronic device 101 may measure a degree of variation in the voltage in the coil as ΔV2. The electronic device 101 may determine that the degree of proximity corresponding to ΔV2 is X2 by comparing the results of measurement and the pre-stored correlation information. The electronic device 101 may then determine data transmission conditions for the data transmission corresponding to the degree of proximity.

Figure 17A:
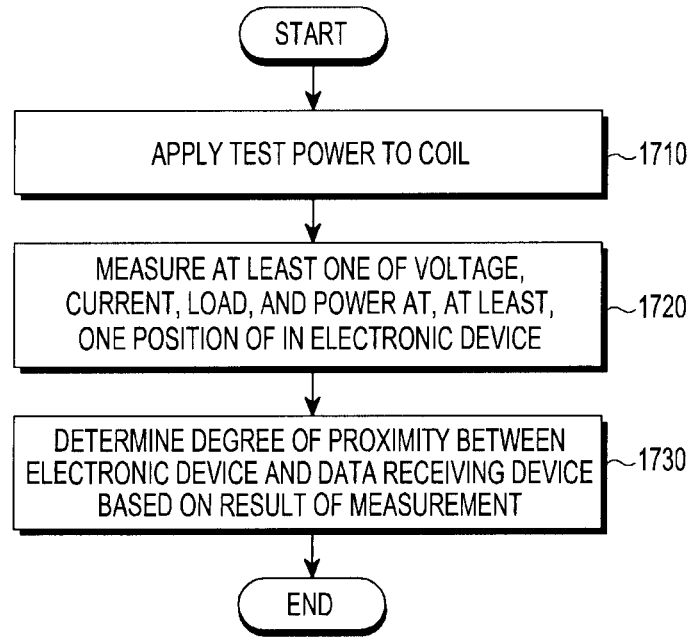
FIG. 17A, FIG. 17B and FIG. 17C are flowcharts illustrating methods for determining a degree of proximity according to embodiments of the present disclosure.

FIG. 17A is a flowchart illustrating a method for determining a degree of proximity according to an embodiment of the present disclosure.

In operation 1710, the electronic device 101 may apply test power to the coil. In operation 1720, the electronic device 101 may measure the magnitude of the voltage, current, impedance, and power at one position of the electronic device 101. In operation 1730, the electronic device 101 may determine the degree of proximity between the electronic device 101 and the data receiving device 420 based on the results of measurement. As described above, the electronic device 101 may determine the degree of proximity between the electronic device 101 and the data receiving device 420 by comparing the results of measurement and the correlation information as set forth above in Table 1 or 2. Although Table 1 or Table 2 shows electrical values measured in the coil, the electronic device 101 according to an embodiment of the present disclosure may abstain from measuring the electrical values in the coil and may instead determine the degree of proximity using electrical values measured at various other internal components.

Figure 17B:
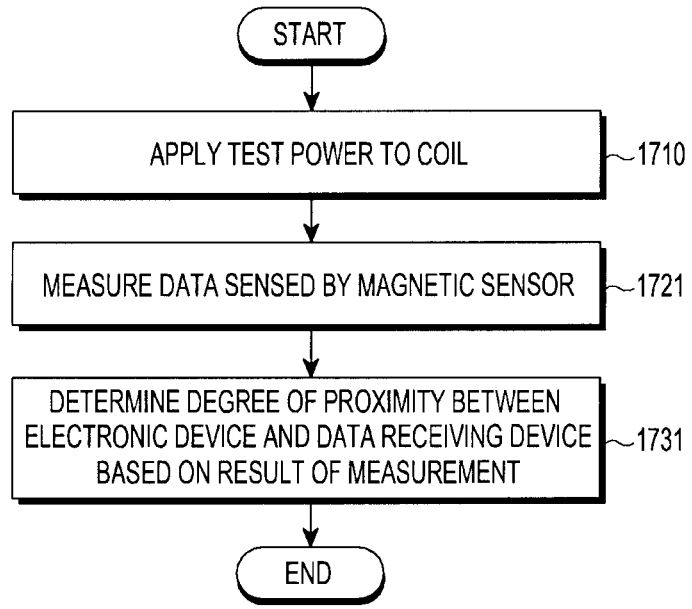

FIG. 17B is a flowchart illustrating a method for determining a degree of proximity according to an embodiment of the present disclosure.

In operation 1710, the electronic device 101 may apply test power to the coil. In operation 1721, the electronic device 101 may measure data sensed by a magnetic sensor. In operation 1731, the electronic device 101 may determine the degree of proximity between the electronic device 101 and the data receiving device 420 based on the results of measurement. As described above in connection with FIGS. 13 and 14, the data sensed by the magnetic sensor 1320 may vary depending on the distance between the electronic device 101 and the data receiving device 420. For example, the electronic device 101 may store information about the correlations between the distance between the electronic device 101 and the data receiving device 420 and the data sensed by the magnetic sensor upon applying the test power as shown in Table 3 below:

TABLE 3

| Electronic device-data receiving device distance | Data sensed by magnetic sensor |
|---|---|
| Where no data receiving device is positioned | M1 |
| X1 | M2 |
| X2 | M3 |

For example, when the test power is applied to the coil, the electronic device 101 may measure the data sensed by the magnetic sensor as M3. The electronic device 101 may use the correlations in Table 3 and determine that the degree of proximity corresponding to M3 is X2. The electronic device 101 may then determine data transmission conditions corresponding to the degree of proximity. The electronic device 101 may also determine the degree of proximity based on the difference between the data sensed by the magnetic sensor and default data. The default data may be data sensed by the magnetic sensor when the data receiving device 420 is sufficiently far away from the electronic device 101.

Figure 17C:
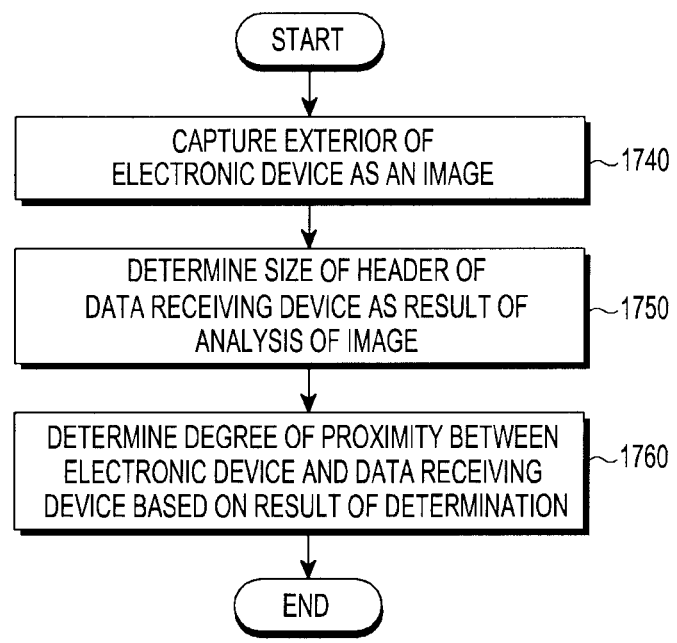

FIG. 17C is a flowchart illustrating a method for determining a degree of proximity according to an embodiment of the present disclosure.

In operation 1740, the electronic device 101 may capture the exterior of the electronic device as an image. In operation 1750, the electronic device 101 may analyze the image and determine the size of the reading header of the data receiving device. For example, the electronic device 101 may have in its memory data regarding various types of reading headers, including data regarding the shapes of various reading headers. The electronic device 101 may then detecting the reading header by using the stored data. The electronic device 101 may determine the size of the reading header detected by determining the number of pixels occupied by the reading header. The size of the reading header in the image may depend upon the distance between the electronic device 101 and the data receiving device 420. Accordingly, the electronic device 101 may determine the distance between the electronic device 101 and the data receiving device 420 using the detected reading header size.

Figure 18:
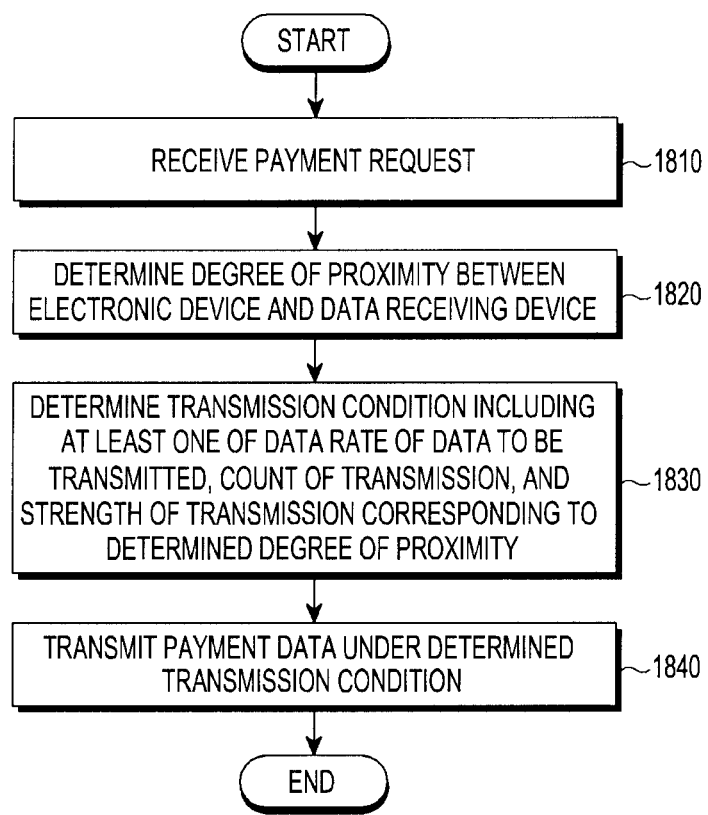
FIG. 18 is a flowchart illustrating a method for controlling an electronic device according to an embodiment of the present disclosure.

FIG. 18 is a flowchart illustrating a method for controlling an electronic device according to an embodiment of the present disclosure.

In operation 1810, the electronic device 101 may receive a payment request. In operation 1820, the electronic device 101 may determine the degree of proximity between the electronic device 101 and the data receiving device 420. As described above, the electronic device 101 may determine the degree of proximity between the electronic device 101 and the data receiving device 420 based on various schemes. In operation 1830, the electronic device 101 may determine a transmission condition including at least one of the data rate (or baud rate) of data to be transmitted, count of transmission, and strength of transmission, corresponding to the determined degree of proximity. In operation 1840, the electronic device 101 may transmit payment data as per the determined transmission condition.

According to an embodiment of the present disclosure, a method for controlling an electronic device for transmitting data may comprise detecting a data receiving device configured to detect a magnetic field corresponding to the data and generating the magnetic field corresponding to the data in response to the detection of the data receiving device.

According to an embodiment of the present disclosure, the method may further comprise applying test power to a coil of the electronic device.

According to an embodiment of the present disclosure, detecting the data receiving device may comprise obtaining at least one of a value of a current, a value of a voltage, a value of power, and a value of impedance at at least one position of the electronic device and determining whether the data receiving device is detected based on at least one of the value of the current, the value of the voltage, the value of the power, and the value of the impedance.

According to an embodiment of the present disclosure, detecting the data receiving device may comprise determining that the data receiving device is detected when a difference between an initial value and at least one of the value of the current, the value of the voltage, the value of the power, and the value of the impedance at the, at least, one point of the electronic device exceeds a preset threshold.

According to an embodiment of the present disclosure, the method may further comprise determining a distance between the electronic device and the data receiving device based on at least one of the value of the current, the value of the voltage, the value of the power, and the value of the impedance and determining at least one of a transmission count for transmission of the data, a magnitude of the magnetic field corresponding to the data, and a data rate for the transmission of the data based on the distance between the electronic device and the data receiving device.

According to an embodiment of the present disclosure, detecting the data receiving device may comprise sensing, by a magnetic sensor of the electronic device, a strength of a magnetic field and determining that the data receiving device is detected when a difference between data sensed by the magnetic sensor and initial data exceeds a preset threshold, the processor determines that the data receiving device is positioned.

According to an embodiment of the present disclosure, the method may further comprise determining a distance between the electronic device and the data receiving device based on the value of the strength of the magnetic field sensed by the magnetic sensor and determining at least one of a transmission count for a transmission of the data, a magnitude of the magnetic field corresponding to the data, and a data rate for the transmission of the data based on the distance between the electronic device and the data receiving device.

According to an embodiment of the present disclosure, detecting the data receiving device may comprise analyzing an image obtained by a camera of the electronic device and determining whether the data receiving device is detected based on a result of the analysis of the image.

According to an embodiment of the present disclosure, the method may further comprise determining the distance between the electronic device and the data receiving device based on a result of the analysis of the image and determining at least one of a transmission count for a transmission of the data, a magnitude of the magnetic field corresponding to the data, and a data rate for the transmission of the data based on the distance between the electronic device and the data receiving device.

According to an embodiment of the present disclosure, determining the distance between the electronic device and the data receiving device may comprise identifying a reading header of the data receiving device in the image and a size of the reading header and determining the distance between the electronic device and the data receiving device based on the size of the identified reading header.

According to an embodiment of the present disclosure, a method for controlling an electronic device for transmitting data may comprise obtaining a distance between the electronic device and a data receiving device upon receiving a data transmission request, determining a data transmission condition based on the distance between the electronic device and the data receiving device, and generating a magnetic field corresponding to the data based on the determined data transmission condition.

According to an embodiment of the present disclosure, obtaining the distance between the electronic device and the data receiving device may comprise applying test power to a coil of the electronic device, obtaining at least one of a value of a current, a value of a voltage, a value of power, and a value of impedance at at least one position of the electronic device, and determining the distance between the electronic device and the data receiving device based on at least one of the value of the current, the value of the voltage, the value of the power, and the value of the impedance.

According to an embodiment of the present disclosure, obtaining the distance between the electronic device and the data receiving device may comprise applying test power to a coil of the electronic device and determining the distance between the electronic device and the data receiving device based on a value of a strength of the magnetic field sensed by a magnetic sensor of the electronic device.

According to an embodiment of the present disclosure, obtaining the distance between the electronic device and the data receiving device may comprise analyzing an image obtained by a camera of the electronic device and determining the distance between the electronic device and the data receiving device based on a result of the analysis of the image.

According to an embodiment of the present disclosure, the data transmission condition may include at least one of a transmission count for a transmission of the data, a magnitude of the magnetic field corresponding to the data, and a data rate for the transmission of the data.

According to an embodiment of the present disclosure, there is provided a storage medium storing instructions executed by at least one processor to enable the processor to perform at least one operation that may include detecting a data receiving device configured to detect a magnetic field corresponding to data to be transmitted and generating the magnetic field corresponding to the data in response to the detection of the data receiving device.

Aspects of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

The embodiments disclosed herein are provided for the purpose of describing and understanding the disclosure but should not be interpreted as limiting the present disclosure. Accordingly, the scope of the present disclosure should be interpreted as including all changes or various embodiments based on the technical spirit of the present disclosure.

What is claimed is:

1. A portable electronic device for transmitting data, comprising:
   a memory storing the data related to payment information;
   a coil for a magnetic secure transmission (MST); and
   a processor configured to:
   apply a non-zero first power to the coil for detecting a data receiving device,
   detect the data receiving device based on a variation on impedance at the coil, while applying the non-zero first power to the coil, and
   apply a second power corresponding to the data to the coil for transmitting the data to the data receiving device, when the data receiving device is detected,
   wherein the second power is determined based on a distance between the portable electronic device and the data receiving device, and
   wherein the second power has different magnitude of voltage or current than the non-zero first power.

2. The portable electronic device of claim 1, wherein the processor is further configured to apply the non-zero first power to the coil as test power.

3. The portable electronic device of claim 1, wherein the processor is further configured to:
   obtain at least one of a value of a current, a value of a voltage, a value of a power, and a value of the impedance at a point of the portable electronic device, and
   determine whether the data receiving device is detected based on at least one of the value of the current, the value of the voltage, the value of the power, and the value of the impedance.

4. The portable electronic device of claim 3, wherein the processor is further configured to determine that the data receiving device is detected when a difference between an initial value and at least one of the value of the current, the value of the voltage, the value of the power, and the value of the impedance at the point of the portable electronic device exceeds a preset threshold.

5. The portable electronic device of claim 3, wherein the processor is further configured to:
   determine the distance between the portable electronic device and the data receiving device based on at least one of the value of the current, the value of the voltage, the value of the power, and the value of the impedance, and
   determine at least one of a transmission count for a transmission of the data, a magnitude of the voltage or the current corresponding to the data, and a data rate for the transmission of the data based on the distance between the portable electronic device and the data receiving device.

6. The portable electronic device of claim 2, further comprising a magnetic sensor configured to sense a strength of a magnetic field, wherein when a difference between data sensed by the magnetic sensor and initial data exceeds a preset threshold, the processor is further configured to determine that the data receiving device is positioned.

7. The portable electronic device of claim 6, wherein the processor is further configured to:
   determine the distance between the portable electronic device and the data receiving device based on a value of the strength of the magnetic field sensed by the magnetic sensor, and
   determine at least one of a transmission count for a transmission of the data, a magnitude of the voltage or the current corresponding to the data, and a data rate for the transmission of the data based on the distance between the portable electronic device and the data receiving device.

8. The portable electronic device of claim 1, further comprising a camera, wherein the processor is further configured to:
   analyze an image obtained by the camera, and
   determine whether the data receiving device is detected based on a result of the analysis of the image.

9. The portable electronic device of claim 8, wherein the processor is further configured to:
   determine the distance between the portable electronic device and the data receiving device based on the result of the analysis of the image, and
   determine at least one of a transmission count for a transmission of the data, a magnitude of the voltage or the current corresponding to the data, and a data rate for the transmission of the data based on the distance between the portable electronic device and the data receiving device.

10. The portable electronic device of claim 9, wherein the processor is further configured to
    determine a reading header of the data receiving device in the image and a size of the reading header, and
    determine the distance between the portable electronic device and the data receiving device based on the size of the determined reading header.

11. A method for controlling a portable electronic device comprising a coil configured to conduct magnetic secure transmission (MST), the method comprising:
    applying a non-zero first power to the coil for detecting a data receiving device;
    detecting the data receiving device based on a variation on impedance at the coil, while applying the non-zero first power to the coil; and
    applying a second power corresponding to data related to payment information to the coil for transmitting the data to the data receiving device, when the data receiving device is detected;
    wherein the second power is determined based on a distance between the portable electronic device and the data receiving device, and
    wherein the second power has different magnitude of voltage or current than the non-zero first power.

12. The method of claim 11, wherein applying the non-zero first power comprises applying the non-zero first power to the coil as test power.

13. The method of claim 11, wherein detecting the data receiving device comprises:
    obtaining at least one of a value of a current, a value of a voltage, a value of a power, and a value of the impedance at a point of the portable electronic device; and
    determining whether the data receiving device is detected based on at least one of the value of the current, the value of the voltage, the value of the power, and the value of the impedance.

14. The method of claim 13, wherein detecting the data receiving device comprises:

determining that the data receiving device is detected when a difference between an initial value and at least one of the value of the current, the value of the voltage, the value of the power, and the value of the impedance at the point of the portable electronic device exceeds a preset threshold.

15. The method of claim 13, further comprising:
determining the distance between the portable electronic device and the data receiving device based on at least one of the value of the current, the value of the voltage, the value of the power, and the value of the impedance; and
determining at least one of a transmission count for transmission of the data, a magnitude of a magnetic field corresponding to the data, and a data rate for the transmission of the data based on the distance between the portable electronic device and the data receiving device.

16. The method of claim 12, wherein detecting the data receiving device comprises:
sensing, by a magnetic sensor of the portable electronic device, a strength of a magnetic field; and
determining that the data receiving device is detected when a difference between data sensed by the magnetic sensor and initial data exceeds a preset threshold.

17. The method of claim 16, further comprising:
determining the distance between the portable electronic device and the data receiving device based on a value of the strength of the magnetic field sensed by the magnetic sensor; and
determining at least one of a transmission count for a transmission of the data, a magnitude of a magnetic field corresponding to the data, and a data rate for the transmission of the data based on the distance between the portable electronic device and the data receiving device.

18. The method of claim 11, wherein detecting the data receiving device comprises:
analyzing an image obtained by a camera of the portable electronic device; and
determining whether the data receiving device is detected based on a result of the analysis of the image.

19. The method of claim 18, further comprising:
determining the distance between the portable electronic device and the data receiving device based on the result of the analysis of the image; and determining at least one of a transmission count for a transmission of the data, a magnitude of a magnetic field corresponding to the data, and a data rate for the transmission of the data based on the distance between the portable electronic device and the data receiving device.

20. A portable electronic device for transmitting data, comprising:
a memory storing the data;
a processor; and
a coil for a magnetic secure transmission (MST), wherein the processor is configured to:
apply first current or voltage to the coil at the portable electronic device for detecting a data receiving device; and
detecting the data receiving device based on a variation on impedance at the coil, while applying a non-zero first power to coil,
determine a distance between the electronic device and the data receiving device,
determine a data transmission condition based on the distance between the portable electronic device and the data receiving device, and
apply second current or voltage corresponding to the data to the coil for transmitting the data based on the data transmission condition,
wherein the second current or voltage are determined based on the distance between the portable electronic device and the data receiving device, and
wherein the second current or voltage are different from the first current or voltage.

21. The portable electronic device of claim 1, wherein the first non-zero power is a positive amount of power.

22. The portable electronic device of claim 1, wherein detect the data receiving device based on the variation on impedance at the coil further comprises:
determining that the data receiving device is within a predetermined distance when the variation on the impedance at the coil exceeds a predetermined amount.

23. The portable electronic device of claim 1, wherein the processor, in response to determining that the distance does not satisfy a condition for detecting the data receiving device, abstains from transmitting the data related to payment information even when receiving a request for the data and displaying a message for inducing to move the electronic device while abstaining from transmitting the data.

* * * * *